United States Patent [19]

Nogami et al.

[11] Patent Number: 6,018,611
[45] Date of Patent: *Jan. 25, 2000

[54] RECORDING APPARATUS WHICH ADAPTIVELY RECORDS AMOUNTS OF LOW RESOLUTION VIDEO INVERSELY TO AMOUNTS OF HIGH RESOLUTION VIDEO WHICH HAS THE SAME PROGRAM CONTENT

[75] Inventors: Hiroaki Nogami, Matsudo; Hironobu Katayama, Noda, both of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/495,025

[22] Filed: Jun. 27, 1995

[30] Foreign Application Priority Data

Jul. 14, 1994 [JP] Japan .................................. 6-162334

[51] Int. Cl.[7] .............................. H04N 5/93; H04N 5/91
[52] U.S. Cl. ................................ 386/52; 386/68; 386/81
[58] Field of Search ................................. 358/335, 312; 360/10.1, 10.3, 33.1, 32; 386/1, 52, 37, 46, 68, 123, 81–82, 111–112; 370/538

[56] References Cited

U.S. PATENT DOCUMENTS

| | | | |
|---|---|---|---|
| 5,168,356 | 12/1992 | Acampora et al. | 358/133 |
| 5,282,049 | 1/1994 | Hatakenaka et al. . | |
| 5,377,051 | 12/1994 | Lane et al. | 360/33.1 |
| 5,450,209 | 9/1995 | Niimura et al. | 358/335 |
| 5,627,935 | 5/1997 | Kim | 386/81 |
| 5,647,048 | 7/1997 | Ting et al. | 386/68 |

FOREIGN PATENT DOCUMENTS

| | | |
|---|---|---|
| 0353758 | 2/1990 | European Pat. Off. . |
| 0353758 A2 | 2/1990 | European Pat. Off. . |
| 0367264 | 5/1990 | European Pat. Off. . |
| 0367264 A2 | 5/1990 | European Pat. Off. . |
| 0562845 | 9/1993 | European Pat. Off. . |
| 0579156 | 1/1994 | European Pat. Off. . |
| 0579156 A2 | 1/1994 | European Pat. Off. . |
| 0597576 A2 | 5/1994 | European Pat. Off. . |
| 0 597 576 A3 | 1/1996 | European Pat. Off. . |

OTHER PUBLICATIONS

"A Study on Digital VCR System for ATV in the U.S.A.", Technical Report of the institute of television Engineers of Japan, VR93–55, vol. 17, No.59, pp. 7–13.

"A Study of High Speed Search Technique for Digital VCR with Hig Bit Rate Reduction System", Technical Report of the Institute of Electronics, Information and Communication Engineers of Japan, MR93–28 (1993–10).

*Primary Examiner*—Dang Ton
*Assistant Examiner*—David R Vincent

[57] ABSTRACT

A digital recording and reproducing apparatus records two kinds of digital signals of an identical video program, generated by high-efficiency coding, or a relatively high bit-rate signal and a relatively low bit-rate signal, onto approximately the same positions on the tape. When the low bit-rate signal is commonly used for normal playback and search-playback or when it is used only for the search-playback, the amount of the search-playback data is adjusted so that data on a number of frames to be a unit for edit work may be recorded onto an integer number of tracks.

10 Claims, 26 Drawing Sheets i : SYNC BLOCK NUMBER

FIG. 13

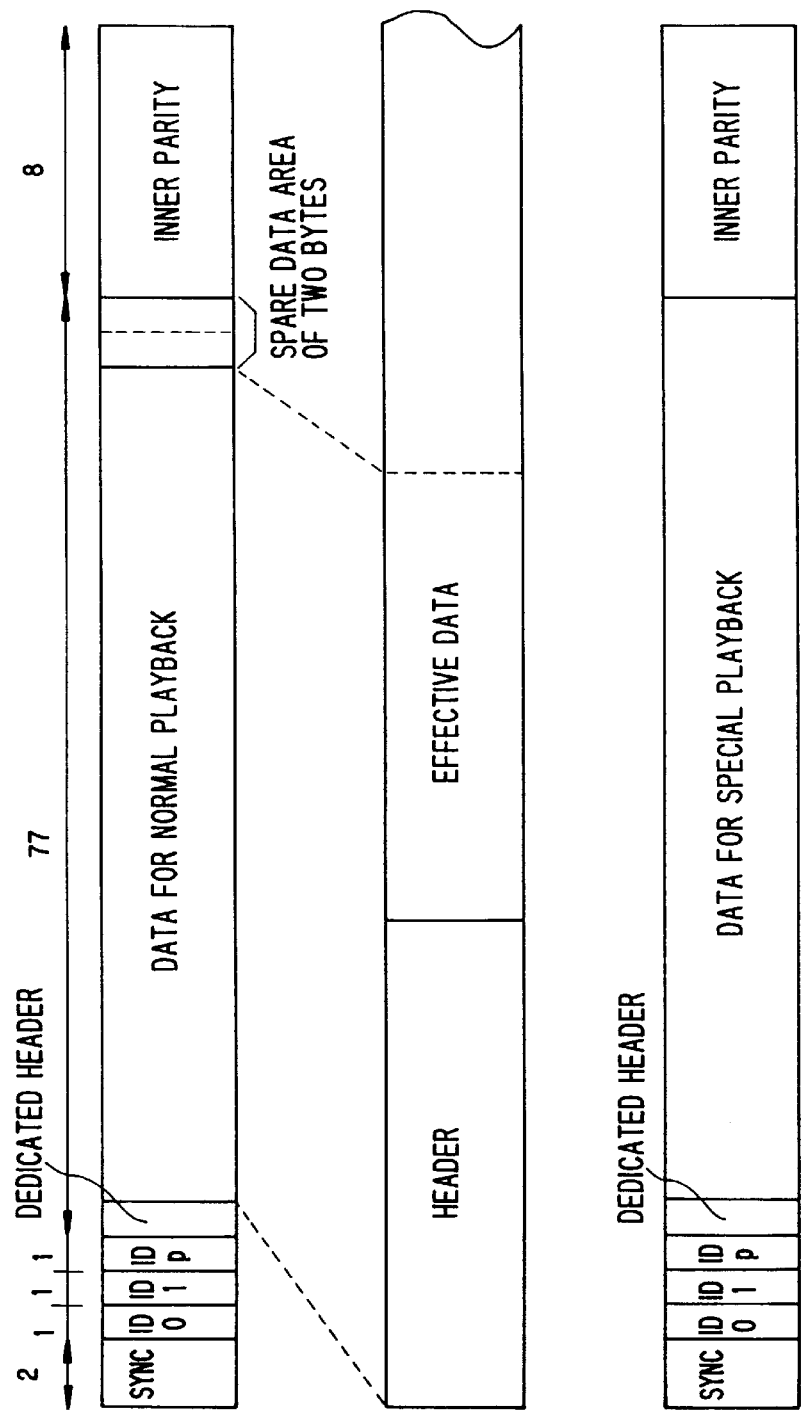

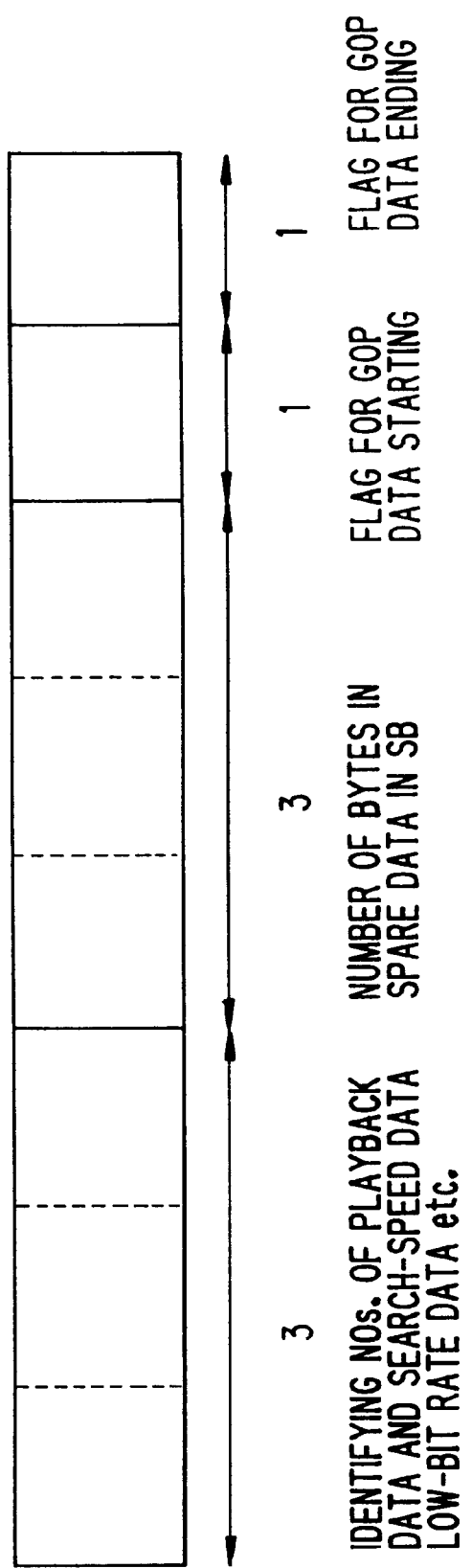

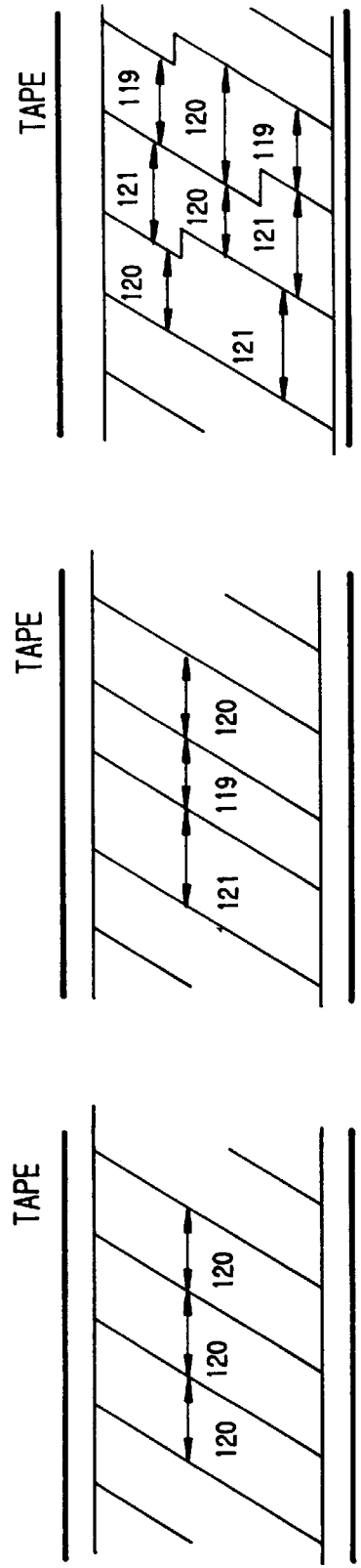

RECORDING APPARATUS WHICH ADAPTIVELY RECORDS AMOUNTS OF LOW RESOLUTION VIDEO INVERSELY TO AMOUNTS OF HIGH RESOLUTION VIDEO WHICH HAS THE SAME PROGRAM CONTENT

BACKGROUND OF THE INVENTION (1) Field of the Invention

The present invention relates to a digital recording and reproducing apparatus in which relatively long recording as well as a multiple number of search playback modes having different search speeds can be realized by compressing band width of the recording signal.

(2) Description of the Prior Art

In order to make an international agreement of standard specifications of a digital VTR for home-use that is expected as the one for a next generation, the HD-DIGITAL VCR CONFERENCE has been set up and an agreement was reached internationally as to between the recording schemes of current television system (to be abbreviated, hereinafter, as SDTV) and that of the HDTV system in April, 1994. The specifications thus agreed are characterized that both the television signals for the SDTV and the HDTV can be recorded using a common configuration. This method mainly effects high-efficiency intraframe coding techniques in which the discrete cosine transform (to be referred to, hereafter, as DCT) and the variable-length coding are mainly performed. One of the reasons for adopting the high-efficiency intraframe coding technique is that there is a necessity for reproducing good-quality pictures smoothly at a high-speed search mode which makes it easy to effect editing work. That is, the system should reproduce high-quality pictures without unnaturality when pictures are reproduced in a search mode of at least ten times or less speed.

FIG. 1 is a block diagram briefly showing the above-stated home-use DVCR which has been internationally consented (those of SD-VCR specifications will hereinafter be referred to as a SD-VCR). An inputted original video image signal is A/D converted into the luminance signal Y and two kinds of chrominance signals $C_N$ and $C_W$, and then divided into blocks of 8×8 pixels. Thereafter, the divided data is shuffled for every block in a block shuffling section 101. This is performed for both to disperse frequency components so as to improve the efficiency of the following high-efficiency coding mainly consisting of the DCT and to disperse burst errors to be caused by dropout during the playback mode. A high-efficiency coding section 102 effects an orthogonal transform using the DCT technique so that the signals are represented by coefficients with respect to frequency components. The section 102 further effects the quantization of the coefficients adaptively as well as the variable-length coding to remove the redundancy or consecutive 0's. Sufficient removal of redundancy in the high-efficiency coding section 102 markedly reduces the bit rate of the signal. In an error correction coding section 103, the thus high-efficiency coded, compressed signal is appended with a necessary parity code for correcting code errors which would be generated at the playback mode. In a Sync and ID adding section 104, a synchronizing code for effecting PCM synchronization and an ID code for discriminating the block content are added to each of sync blocks containing the synchronizing code. A modulating section 105 represents a modulator for efficiently recording the digital recording signal. The 24–25 modulating method is adopted in the modulator used in the configuration of the DVCR specifications for the purpose of reducing the d.c. component of the recording signal. The output signal from the modulation is amplified through a recording amplifier and recorded on a magnetic recording medium 106 via video heads. In the playback mode, the recorded signal is picked up via the video head, and the thus reproduced signal is amplified through a playback amplifier and supplied to a demodulating section 107, to thereby recover digital signals. Then, the operation is effected in just the reverse direction or in the opposed direction to that effected in the recording mode. That is, a sync and ID detecting section 108 detects the synchronizing code for PCM as well as decodes and deciphers the content of the ID code. An error correcting and decoding section 109 detects code errors and completely corrects the errors if any. A decoding and modifying section 110 subjects the video information compressed by the high-efficiency coding section to the variable-length decoding and the inverse quantization and effects IDCT for the thus processed video information to recover a video signal approximately corresponding to the original video signal. If there is an erroneous code which is unrecoverable, the section 110 effects interpolation using data before and after the code in question. The thus recovered output is still not the complete video signal, but should be deshuffled by every block in the following deshuffling section 111, to thereby reproduce the original video signal.

FIG. 2 shows a structure and a recording format of sync blocks in the DVCR stated above. Each sync block is composed of 90 bytes containing two bytes for a synchronizing code, three bytes for an ID code and 77 bytes for video data with eight bytes of inner parity code of the Reed-Solomon correcting code. Assigned for video data in the format are 135 sync blocks (to be abbreviated SB, hereinbelow) each having 77 bytes.

FIGS. 3A and 3B show two types of head arrangements applicable to the SD-VCR.

At present, no specific scheme is established for recording the signal which is formed by compressing image data on the basis of the high-efficiency coding scheme standardized by the MPEG (Moving Picture Image Coding Expert Group) using the tape driver, signal processor and recording and reproducing system in the aforementioned DVCR. FIG. 4 shows a structure of coding proposed as a provisional standard for the ATV. In the figure, a symbol I represents a coding process within a frame, P represents a predictive coding precess relative to a forward frame as an interframe coding process and B represents another predictive coding process relative to both the forward and backward frames. In the case where the video signal thus formulated based on the above interframe predicative coding is recorded as it is on the basis of the SD specifications already consented, the signal is reproduced form several different tracks as disconnected data as shown in FIGS. 5A and 5B when the system is operated in the picture search playback mode. Accordingly, it is barely possible to reproduce a complete picture with clear content.

In a case where the MPEG signal processing scheme is adopted as in the ATV, noting the fact that intraframe processed I-pictures repeatedly appear every twelfth frame, a technique in which special data prepared for the special playback is recorded in specially allotted recording areas has been disclosed in a Technical Report vol.17 No. 59 of The Institute of Television Engineers of Japan. This method however requires a considerable amount of data for reproducing I-pictures for the ATV as will be shown hereinbelow.

Consider a case where I-pictures are recorded with a reduced quality of image equivalent to that of the NTSC or less, for example, where only DCT coefficients for d.c. components which exist one for each DCT block of 8×8 pixels are used. In this case, suppose that the number of valid samples is 1,920; the number of valid scan lines is 1,080 therefore the blocks amount to 32,400. When only the d.c. components which exist one for every 64 components of each DCT are transformed into 8-bit data, the amount of data to be recorded totals to 32,400 bytes. In addition, if four bits are allotted for each of the remaining coefficients for a.c. components, another data of 1,020,600 bytes is required since each DCT block has 63 a.c. components. In other words, use of the a.c. coefficients bulks required data amount up to about 32 times. On the other hand, actually available data amount in the search playback mode depends on the recording system and the type of the recorded signal used. As an example of the ATV, if transmitting packets are transmitted at a rate of 19.3 Mbps and the rotating rate of the head is set up to be 150 rps, each track needs to have a data recording area of 105 SBs in order to completely record the transmitting packets. Accordingly, 30 SBs can be allotted as the data recording area for data in the search playback mode and therefore the total allowable data-recording area for the I-pictures of the ATV signal periodically appearing every twelfth frame amounts to 3600 SBs. Recording only the d.c. components of the I-picture requires 421 SBs, which corresponds to about one-eighth of the allowable data-recording area while recording of eight a.c. coefficients for every DCT block requires further 3366 SBs.

If data-recording areas able to be commonly used for the two kinds of head arrangements (see FIGS. 3A and B) are to be considered as will be described later with reference to FIG. 25, fifteen data-recording areas are required for 30 tracks for the triple(3×)-speed search-playback mode. That is, sixty data-recording areas each consisting of 60 SBs are required within a period of twelve frames. Of these, forty areas can be effectively used in the aforementioned search-playback mode and this corresponds to 2,400 SBs or 184,800 bytes. In this case, the allowable number of a.c. components for each DCT block is 4.7. This is the result when all the areas are allotted to 3×-speed search-playback mode. In practice, data-recording areas should be allotted for quintuple(5×)-speed mode, fifteen-times(15×)-speed mode etc., so that effective data amount allowable for each of the search modes decreases considerably. For example, suppose that 1,740 SBs can be taken as allowable recording areas for 3×-speed search mode, the available recording-areas amount to 1,160 SBs or 89,320 bytes. Further details will be discussed later.

Particularly, in realizing a high-speed search mode, (for example, 15×-speed search mode), to obtain ten effective recording areas within 30 tracks requires 96 established recording areas. This will be described later with reference to FIG. 13.

The following items are problems to be solved as to the recording apparatus described heretofore:
(1) As future broadcasting, both the ATV broadcasting for high-quality images and the SDTV (NTSC, PAL or SECAM) broadcasting are planned to be delivered in parallel through ground broadcasting, satellite broadcasting and CATV. However, there is no apparatus which is able to record both the high-bit rate signal and the low-bit rate signal, therefore, two types of recording apparatuses are required for recording respective signals.
(2) Since the conventional apparatus, unlike the present invention which has a means for recording the low-bit-rate signal with the high-bit-rate signal and allowing the low-bit-rate signal to be used for the normal playback and the special playback, has no such means, it is necessary to display special-play images using a high-priced, high-resolution, wide display even if quality of pictures reproducible in the search mode is lower than that of the SDTV.
(3) Since, in the special-playback method already proposed as to the MPEG recording and as to the ATV recording, only the I-pictures are to be recorded and used for the special playback operation, it is impossible to reproduce smoothly animated images.
(4) There is a report of a method whereby intraframes and interframes are separately recorded. Since the data amount of an intraframe is, in general, ten times greater than that of an interframe, this makes it very difficult to establish recording areas for special play. There is another proposal that interframes are converted into intraframes for special playback, but this method still increases the amount of data required for special play.
(5) If the frame cycle of the recorded signal is not related with the multiple number of recording areas, it becomes difficult to meet recording positions of the normal playback data with recording positions of the special playback data. This makes it difficult to make sure the content of data on the tape in the search-playback mode and makes the signal processing circuit complicated.
(6) Mere allocation of recording areas for special playback bulks the amount of data to be recorded if there is necessity to ensure both forward and reverse searching operations.
(7) As to the head arrangement, in order to establish the interchangeability between the use of the double head and the use of the single head, greater recording areas are necessary.
(8) Since in the search-playback at a high speed, the periodic cycle of retracing with the head becomes long, it is impossible to actively follow the change of the search-playback speed. In order for the system to realize the active follow, duplicated data must be recorded in different places. This requires greater areas for data recording.

SUMMARY OF THE INVENTION

The present invention has been achieved in view of the above problems, and it is therefore an object of the present invention to provide a digital recording and reproducing apparatus which is able to reproduce high-quality images in the search-playback mode even if both the intraframes and the interframes are encoded based on the high-efficiency coding scheme.

The present invention has been achieved to attain the above object and the gist of the present invention is as follows:

In the beginning, in accordance with a first feature of the present invention, a digital recording and reproducing apparatus for recording and reproducing both relatively high-bit rate data for normal playback and relatively low-bit rate data for special playback, is constructed such that the amount of data to be recorded as the special playback data is properly adjusted so that recording areas for recording the normal playback data can be easily varied.

In accordance with a second feature of the present invention, a digital recording and reproducing apparatus for recording and reproducing images which are band-compressed by high-efficiency coding, is constructed such that when a digital signal having both intraframe information and interframe information is processed to record and reproduce images, both relatively high-bit-rate and relatively low-bit-rate signals are recorded into approximately the same positions, and all or part of the relatively low-bit-rate signal is used to effect special playback which is an indispensable function of a video recording apparatus, whereby the amount of data for the special playback can be varied adaptively.

A third feature of the present invention resides in a digital recording and reproducing apparatus having the above second feature wherein a means for adaptively varying the amount of data for the special playback is used to record image data per a certain number of frames as a unit, onto an arbitrary-integer number of tracks.

In accordance with a fourth feature of the invention, a digital recording and reproducing apparatus for recording and reproducing images which are band-compressed by high-efficiency coding, is constructed such that when a digital signal having both intraframe information and interframe information is processed to record and reproduce images, both relatively high-bit-rate and relatively low-bit-rate signals are recorded into approximately the same positions, and all or part of the relatively low-bit-rate signal is used to effect special playback.

Next, a fifth feature of the invention is a digital recording and reproducing apparatus which has the above fourth feature and which is constructed such that the band-compressing is effected based on the MPEG scheme and image data is recorded one sequence as a unit, the sequence consisting of at least one GOP (Group of Picture) as a unit, onto a fixed number of tracks while the amount of data for the special playback can be varied adaptively.

A sixth feature of the invention is a digital recording and reproducing apparatus which has the above second feature and is constructed such that when data of a different video-program is recorded by inserting and replacing data already recorded on a VCR tape, if the amount of data for the newly inserted video-program varies from the average amount of the data, the amount of data for the special playback can be adaptively adjusted so as to allow the data for the newly inserted video-program to be recorded only in the specified region on the tape and reproduced therefrom.

In accordance with a seventh feature of the invention, a digital recording and reproducing apparatus is characterized by the operation comprising the steps of:

receiving an input signal;

allotting the input signal to multiple-number of sync blocks for recording the data into the VCR;

in order to protect important information such as packet headers contained in the input signal, recording sync blocks containing important information as a whole or only the important portions such as packet headers, into previously reserved areas for spare data; and when the important data presents any error and the error cannot be corrected, substituting the whole sync block having erroneous data by the corresponding sync block recorded as spare data or substituting the erroneous data itself by the corresponding important portion.

Next, an eighth feature of the invention resides in a digital recording and reproducing apparatus which has the above seventh feature and which is constructed such that packet headers duplicated and recorded in the spare recording areas can be searched in a high-speed operation mode.

A ninth feature of the invention is a digital recording and reproducing apparatus having the above seventh feature in which, using a means having the above second feature, the recording areas for recording spare data of sync blocks and the like containing important portions or only important portions are set up by adaptively varying the amount of data for the special playback.

Finally, in accordance with a tenth feature of the invention, a digital recording and reproducing apparatus comprises: a simultaneous reproducing head; and a detecting circuit for detecting code-errors as to packet headers reproduced simultaneously at the time of recording with the head, and is constructed such that when the detecting circuit detects a code-error in a packet header, the data portion containing the packet header in the recording signal is re-inserted into the recorded signal so that the data may be recorded correctly.

In order to realize the above features, the following two means are used.

As a first means, the digital recording and reproducing apparatus includes: a means capable of recording a high-bit rate signal data and a low-bit rate signal data, both on the same program content; a means which utilizes the low-bit rate signal data inclusive of both intraframe information and interframe information in a layered manner in order to produce special playback data; a means for recording the three types of digital signal data thus formed so that all the data is substantially recorded in the same positions on recording tracks in association with a frame cycle of the recorded signal of high-bit rate data; and a means for setting up recording areas for the special playback information on recording tracks so that the relation between an appearing cycle of the recording areas and a cycle of the high-bit rate signal frames becomes a simple integer ratio and a unit of the recording tracks is determined by the 1.c.m. of some or several search speeds or the multiple of the 1.c.m.

A second means is constructed so that in recording areas for the low-bit rate data are put together in the approximately middle portion of the tape in order to surely utilize the low-bit rate data for the search-playback and the data groups available for different search-speed modes are allotted in a layered manner from the order of the low-speed search data while areas of recording P-picture for effecting forward-predictive coding process between frames are secured in the recording areas for the low-speed search data, whereby smoothly animated images can be reproduced. Further, all the data secured for the lowest speed search-playback is adapted to be commonly used for the reproduction in the normal playback mode, whereby the amount of data to be used for only the search-playback is reduced as much as possible. With this configuration, it becomes possible to make the most of the aforementioned different interchangeable functions.

In the present invention, a low-bit rate signal of 5 Mbps or less can be formed based on an ATV signal of, for example, 19.3 Mbps, so that the thus formed low-bit rate signal may be used for displaying the same program content as contained in the ATV signal. Further, almost all the aforementioned low-bit rate signal, inclusive of P-pictures and bidirectional predictive B-pictures, is adapted to commonly be used as the search-playback data. Therefore, if simultaneous broadcasting of the ATV signal with a low-bit rate signal starts in the near future, the apparatus can be used to record both the signals broadcasted and reproduce smoothly animated images in the search-playback mode. Further, the aforementioned search-playback picture can be displayed on a low-cost, compact, light-weight, current system display built in, for example, a VTR. Moreover, it is possible to display the search-playback picture on a display in a multimedia terminal device, without converting the system scheme. Moreover, it is possible, as required, to display the search playback picture on a wide, high-quality display for the ATV by only adding a simple double-scan system converting means.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 13 is a diagram showing head traces for 15×-search-playback operation in the first embodiment of the present invention and a data-layout therefor;

FIG. 19A is a diagram showing a SB structure of the normal playback data when data on ATV packets is allotted to SBs in the second embodiment of the present invention;

FIG. 19B is a diagram showing a SB structure of an input signal when data on ATV packets is allotted to SBs in the second embodiment of the present invention;

FIG. 19C is a diagram showing a SB structure of the special playback data when data on ATV packets is allotted to SBs in the second embodiment of the present invention;

FIG. 20 is a diagram showing a configuration of a dedicated header for use in the second embodiment of the present invention;

FIG. 21A is a diagram showing a condition of recording areas of GOP data on the tape in the second embodiment of the present invention wherein the data is recorded on a fixed number of tracks;

FIG. 21B is a diagram showing a condition of recording areas of GOP data on the tape in the second embodiment of the present invention wherein the data is recorded on an integer number of tracks;

FIG. 21C is a diagram showing a comparative example in which tracks are not used as a unit for recording GOP data, as compared with FIGS. 21A and 21B in which conditions of recording areas of GOP data on the tape in the second embodiment of the present invention;

DESCRIPTION OF THE PREFERRED EMBODIMENTS

A first embodiment of the present invention will be hereinafter described.

Figure 1:
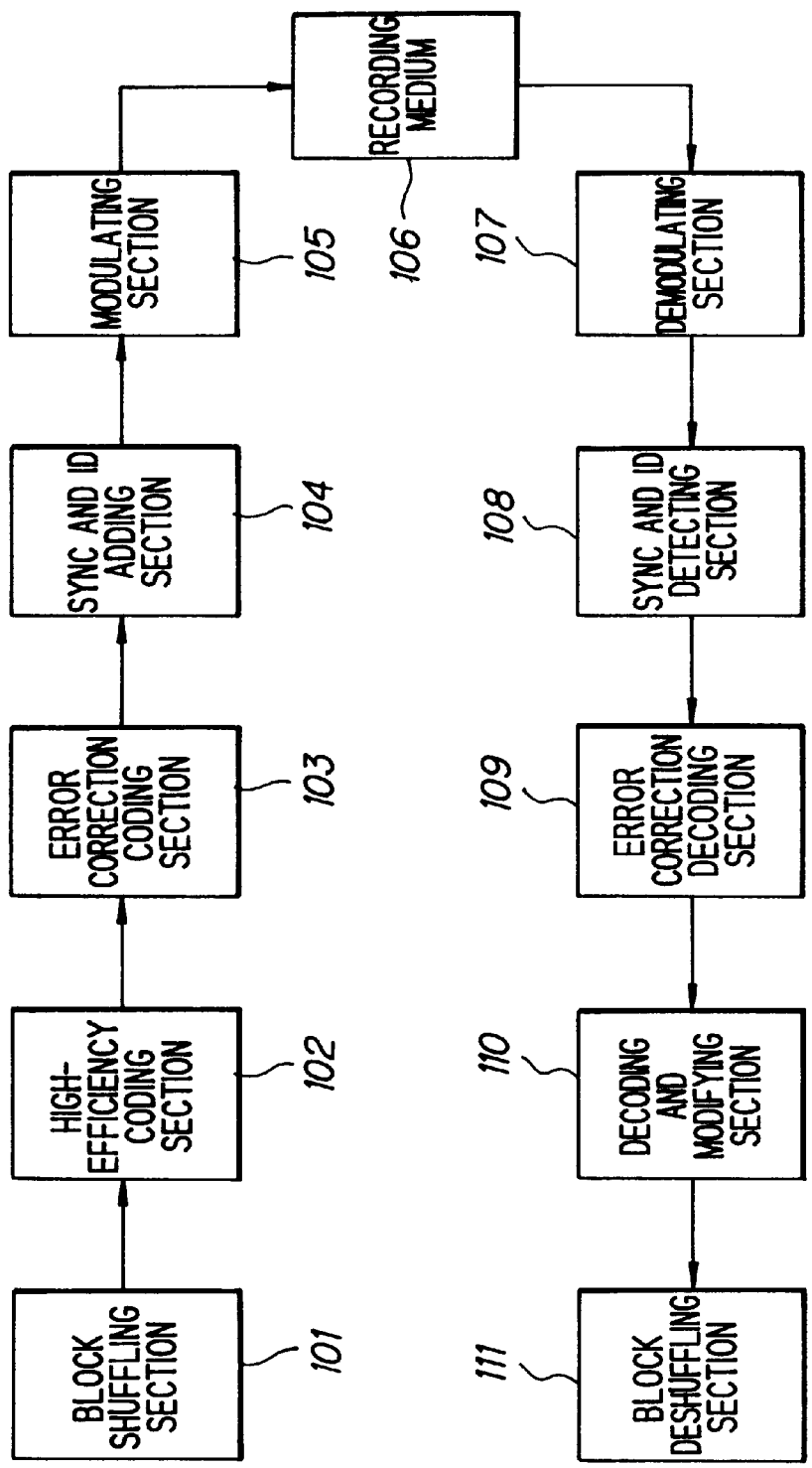
FIG. 1 is a circuit block diagram of a prior art SD-VCR.
Figure 2:
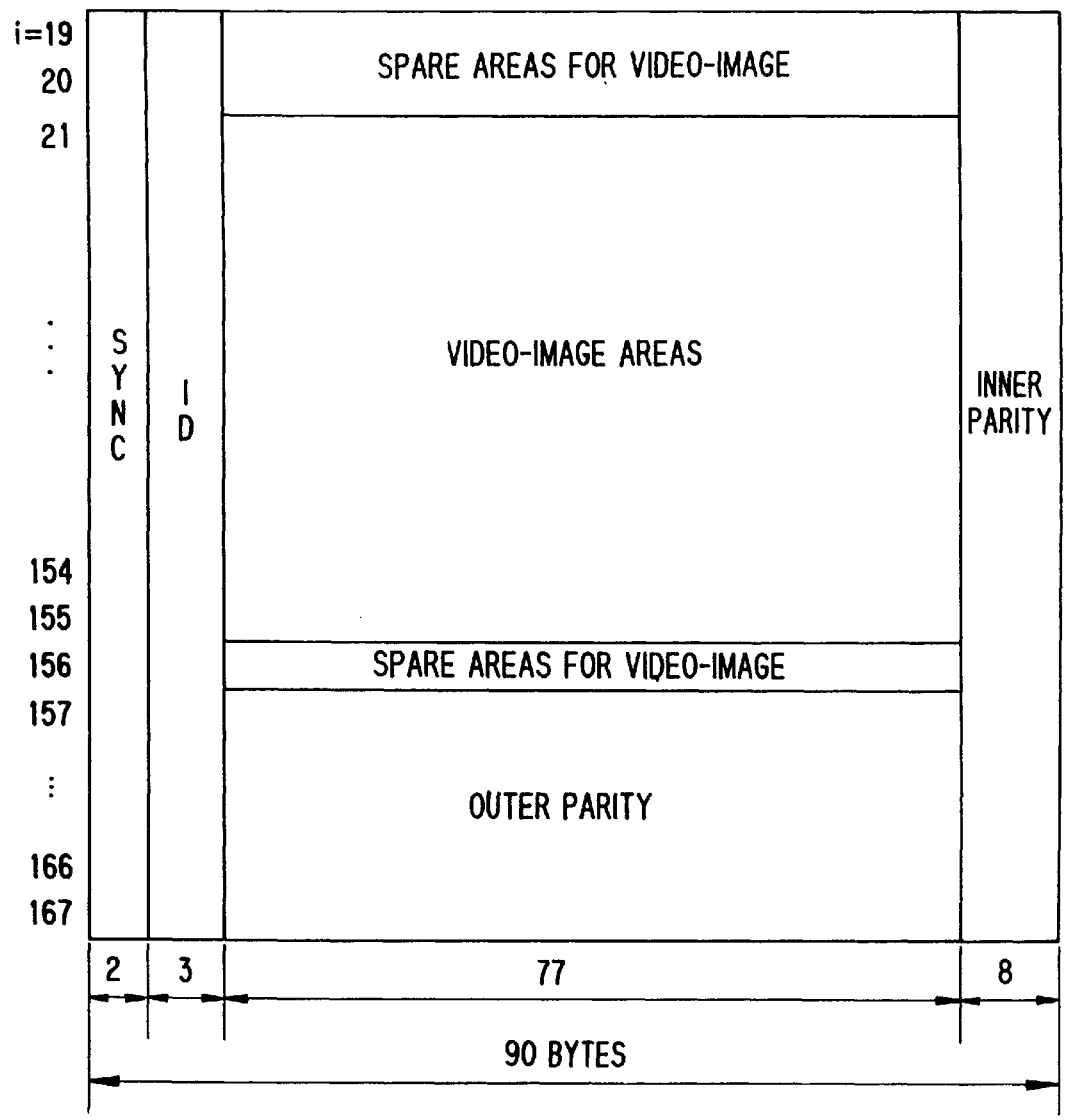
FIG. 2 is a structure of SBs of a prior art SD-VCR.
Figure 3B:
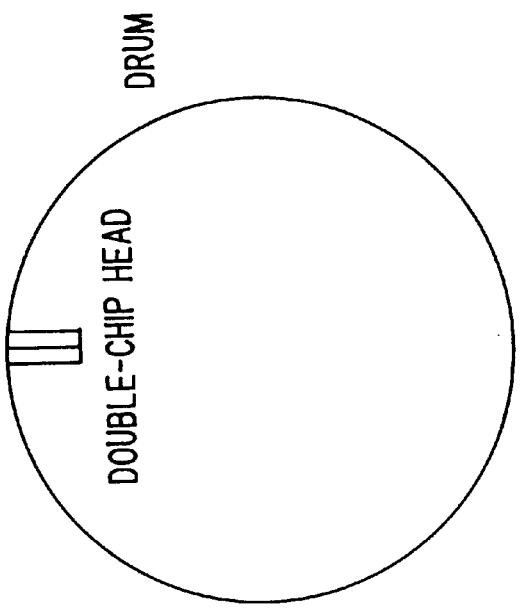
FIG. 3B is a view showing a head arrangement of a double-chip head in a prior art SD-VCR.
Figure 3A:
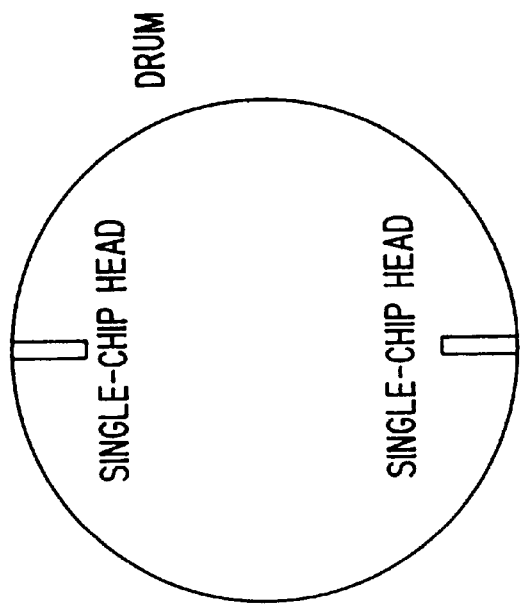
FIG. 3A is a view showing a head arrangement of a pair of single-chip heads in radially opposite positions in a prior art SD-VCR.
Figure 4:
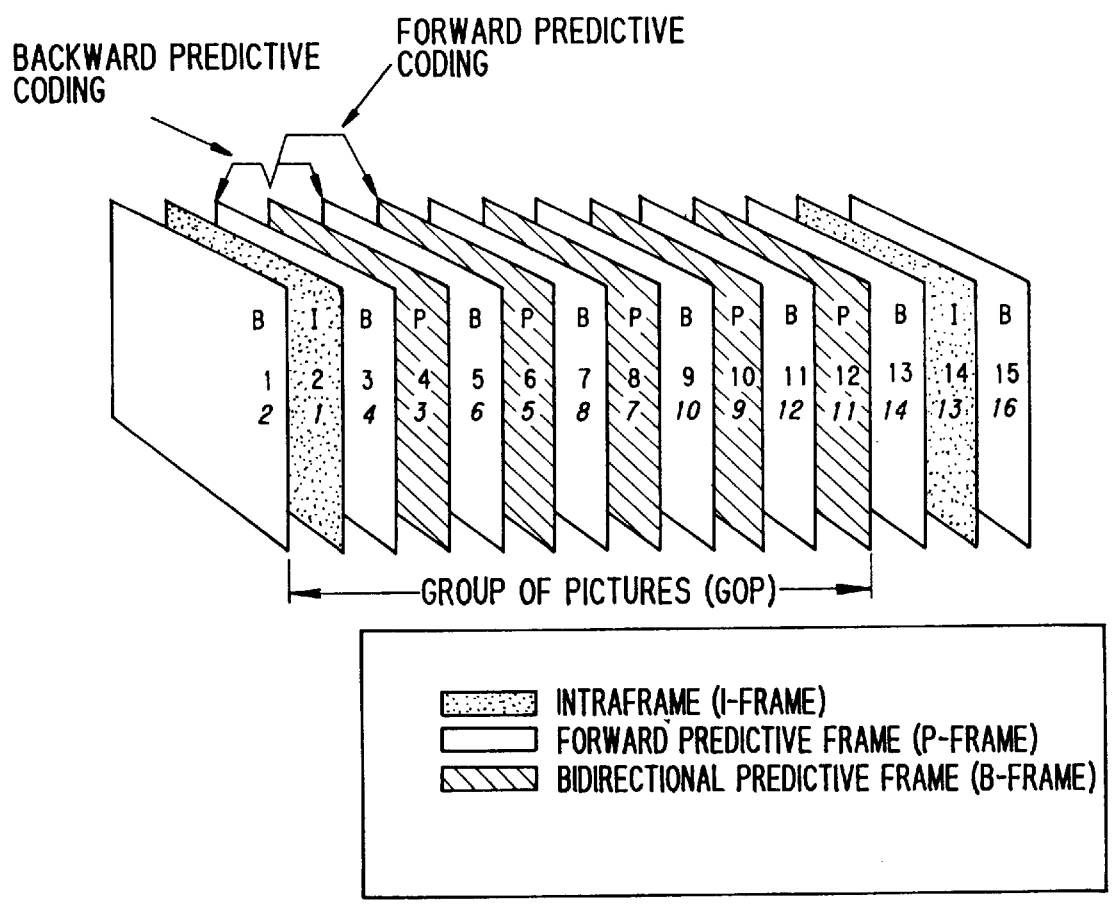
FIG. 4 is a view showing a frame structure of a transmitting packet for the prior art typical ATV.
Figure 5A:
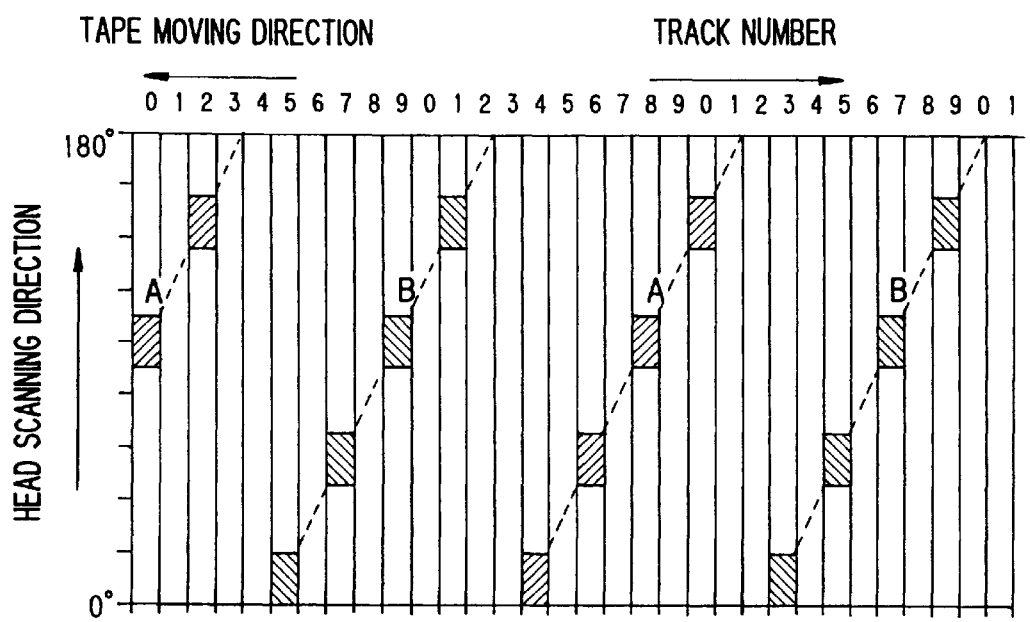
FIG. 5A is a chart showing an example of a data-reproducing manner in 9×-speed search-playback mode with the prior art single chip heads (in which a pair of single-chip heads are arranged in radially opposite positions)
Figure 5B:
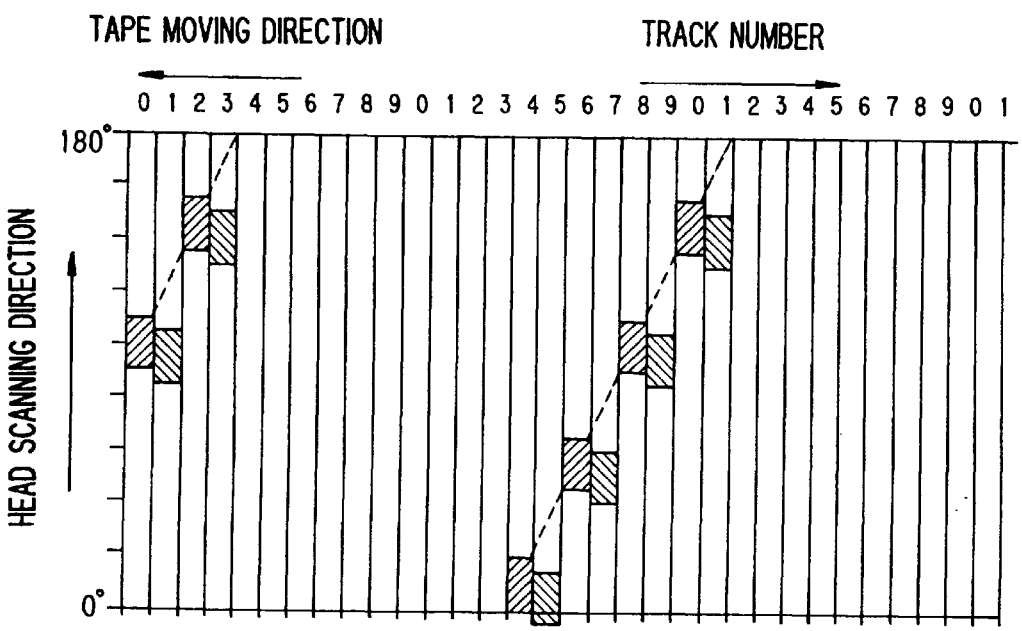
FIG. 5B is a chart showing an example of a data-reproducing manner in 9×-speed search-playback mode with the conventional double-chip head.
Figure 6:
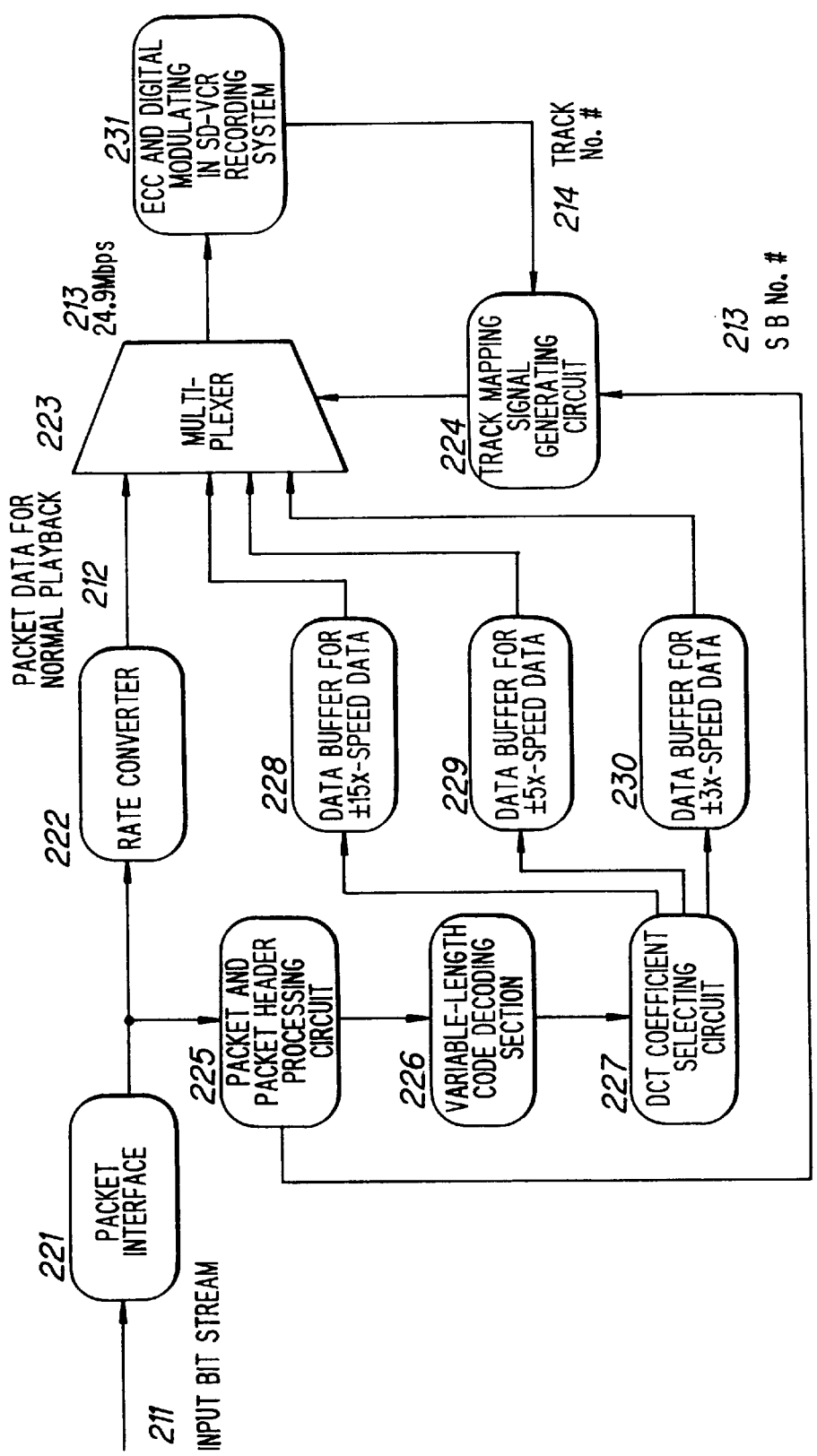
FIG. 6 is a block diagram showing a recording system of a first embodiment of the present invention where the ATV bit stream is inputted.
Figure 7:
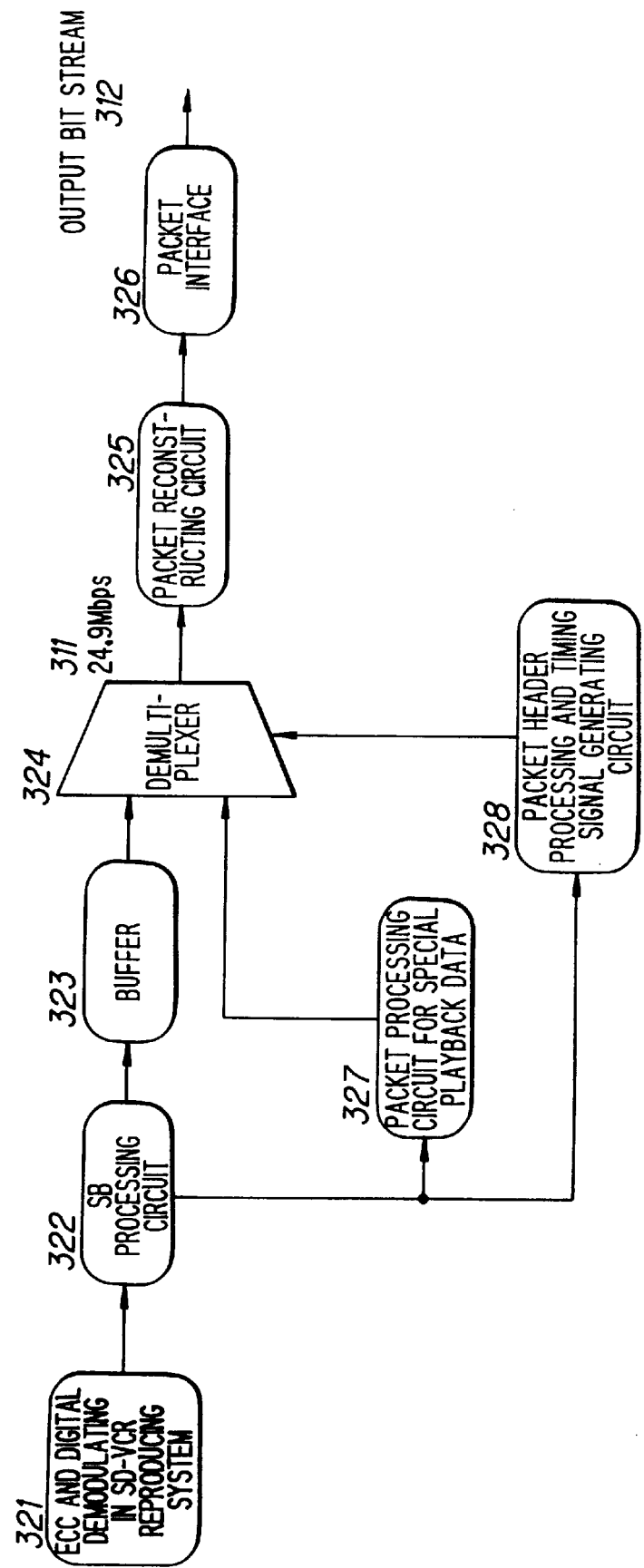
FIG. 7 is a block diagram showing a reproducing system of the first embodiment of the present invention where the ATV bit stream is inputted.
Figure 8:
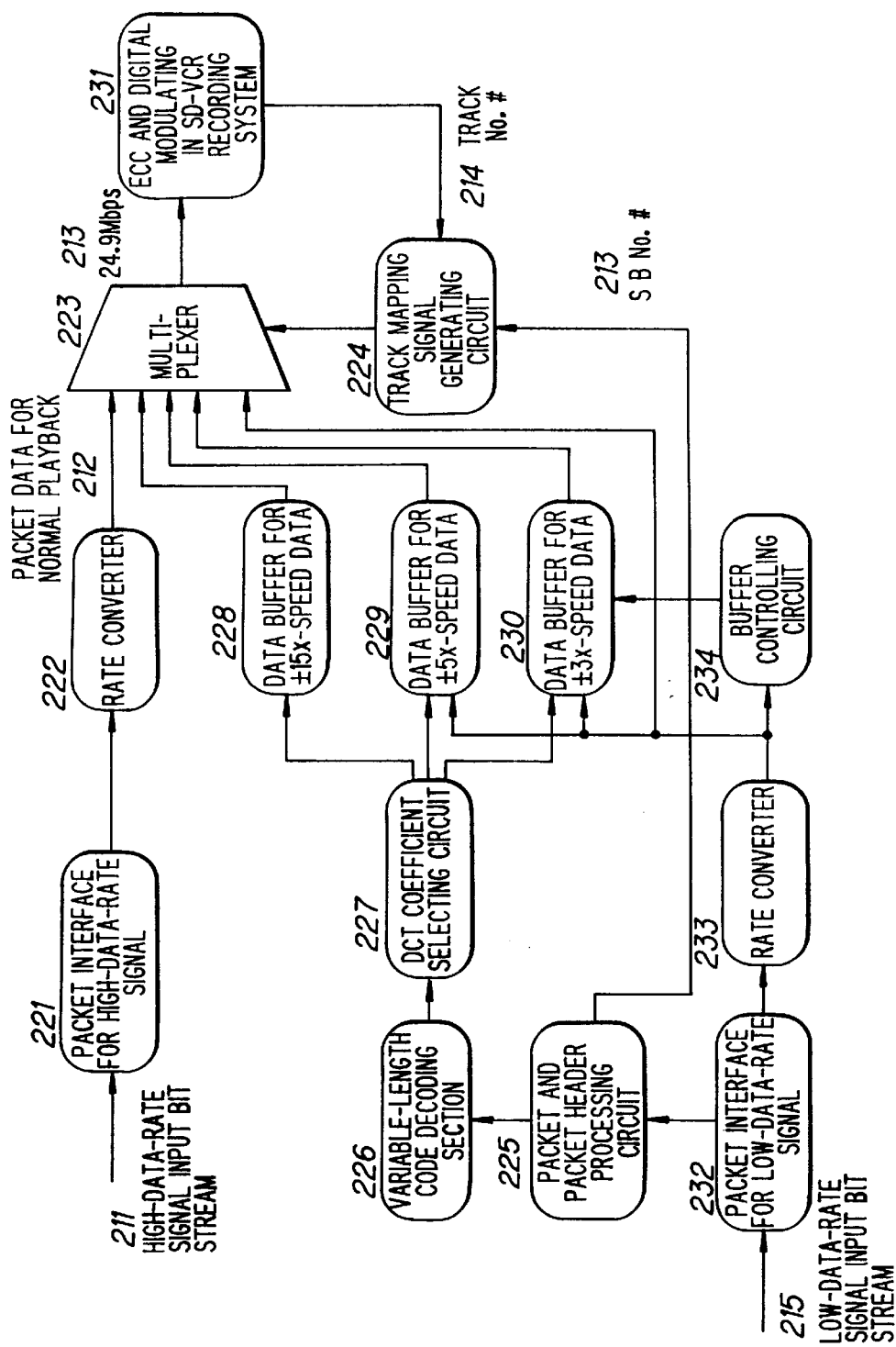
FIG. 8 is a block diagram showing a recording system of the first embodiment of the present invention where high-data-rate and low-data rate signals are simultaneously inputted.
Figure 9:
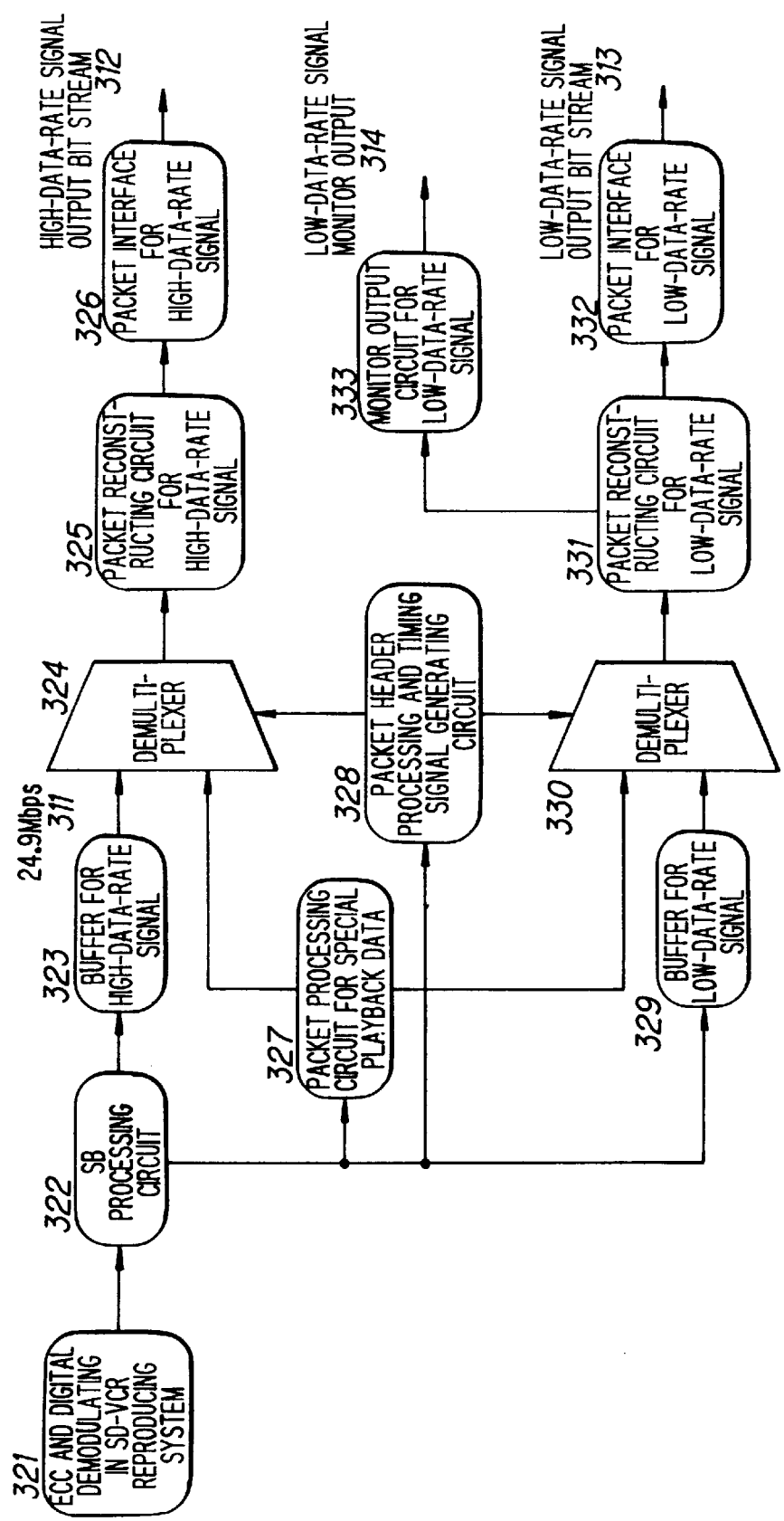
FIG. 9 is a block diagram showing a reproducing system of the first embodiment of the present invention where high-data-rate and low-data rate signals are simultaneously inputted.

In the beginning, FIGS. 6 and 8 show block diagrams of a recording part of an example of a VCR to which the present invention is applied while FIGS. 7 and 9 s How block diagrams a reproducing part of the same. Although description of the embodiment will be made referring to a SD-VCR, the present invention will not be limited to the SD-VCR system. That is, the present invention is independent of the error correction codes (ECC), the digital modulating and demodulating scheme, the cassette type the mechanical configuration and the servomechanism.

FIGS. 6 and 7 show a case where the ATV bit stream signal is inputted to form data for special play. FIGS. 8 and 9 show a case where both high and low data-rate bit streams are supplied as input signals and the low data-rate bit streams are used to form data for the special play.

When the low-bit rate signal is input ted, the data can be commonly used for both the search date and the data of the low-bit rate signal in the normal play back mode. In contrast, when the ATV bit-stream data or the high-bit rate signal is used to prepare search data, the search data produced serves as dedicated data for that purpose only.

The basic operation is exemplified by a case where the ATV bit-stream signal is inputted.

A packet interface section 221 disposed on the input side in FIG. 6 is identical with that of a typical ATV decoder. First of all, the apparatus receives the ATV bit stream 211 and detects digital synchronizing codes to form required timing signals from respective packet headers. The term 'packet header' used here indicates all the headers in different layers. The transport layer of the ATV includes a link header and an adaptation header. The layer for transport by the MPEG includes a PES header as well as headers f(or different lower-rank layers. The apparatus effects required processing such as data scrambling, PID processing etc., in accordance with the link header, adaptation header, PES header and the like.

Thereafter, the apparatus starts converting the data rate in a rate converter 222 where input data is converted into two classes of data streams, i.e., for the normal playback mode and the search mode.

For the data for the normal playback mode, two packets of the bit stream (188 bytes×2=376 bytes) is allotted to five SD-VTR sync blocks (to be referred to as SBs) and recorded therein (77 bytes (effective area)×5=385 bytes). In playback, all the data is picked up to reconstruct the original bit stream and output it.

Data for search-playback modes is prepared and recorded as follows: At first, syntax of each packet is analyzed in a packet end packet-header processing circuit 225 and effective data in the packet is decoded as to variable-length codes (in a variable-length code decoding section 226). Then, a DCT coefficient selecting circuit 227 picks out DCT coefficients from the data and constructs data for respective search-playback modes from these coefficients. In this embodiment, three classes of data, for 3×-speed mode, 5×-speed mode and 15×-speed mode, are prepared in respective data buffers 228, 229 and 230. This will be further detailed hereinbelow.

Then, a multiplexer 223 multiplexes the data for normal playback and the three classes of data for the search-playback modes so as to form the following tape patterns. To effect this, a track mapping signal generating circuit 224 generates a control signal for multiplexing based on the packet header of a packet inputted, a SB number and a track position.

Subsequent processing at recording is effected in the same manner as in the normal SD-VCR, that is, error correction signals are added to the data, the data is subjected to the 24–25 modulation and recorded on the tape by means of a recording amplifier (in a digital modulating/demodulating/recorder 231 in SD-VCR reproducing system).

Here, in both the normal playback and the search playback modes the operation is effected in the same manner as in the normal SD-VCR, that is, the data, after passing through the regenerating amplifier and the equalizer, is subjected to digital modulation and error correction (in a digital demodulating/ECC 321 in the SD-VCR reproducing system, as illustrated in FIG. 7 for example). Then, discrimination of the SB data is effected in an SB data processing circuit 322.

At the normal playback mode, a buffer 323 controls the timing of the signal from the SB data processing circuit 322 and outputs the signal to a demultiplexer 324, which in turn processes the data so as to be equal to the original packets. A packet reconstructing circuit 325 effects rate transform and adds headers etc., and outputs the resulting data via a packet interface 326.

At the search-playback mode, after similar data discrimination is done in the SB data processing circuit 322, a special-playback-data packet processing circuit 327 constructs data from the packet header, valid data, data to be invalid (stuffing bytes). The stuffing bytes are inserted so that the final data becomes a packet of 188 bytes.

Switching between the normal playback data and the special-playback data as well as the control of the output timing of the special-playback data is effected by the demultiplexer 324 while the control signal is generated by a packet header processing and timing signal generating circuit 328.

Figures 11A, 11B, 11C:
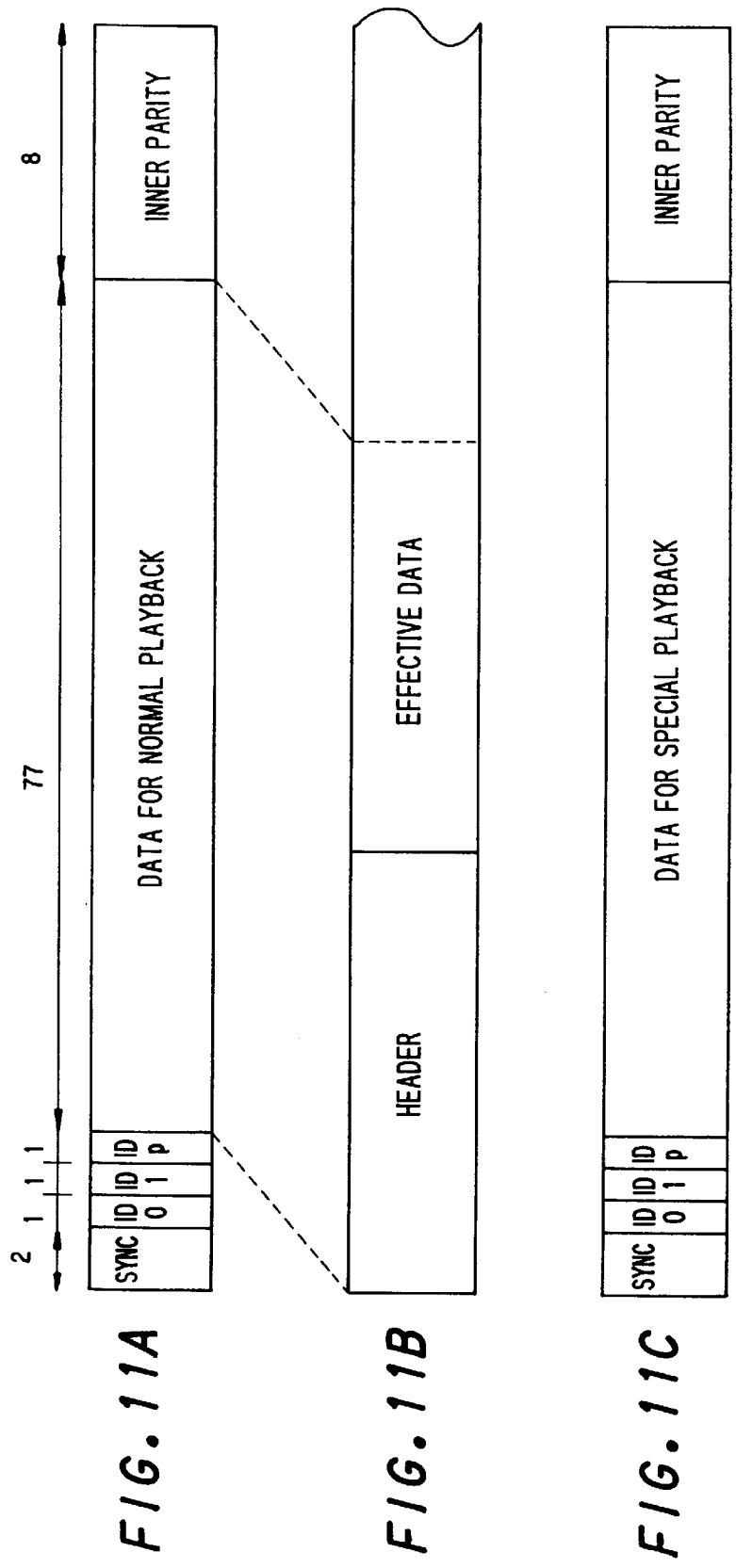
FIG. 11A is a diagram showing a SB structure of the normal playback operation along the track direction in the first embodiment of the present invention.
FIG. 11B is a diagram showing a SB structure of an input packet along the track direction in the first embodiment of the present invention.
FIG. 11C is a diagram showing a SB structure of a packet for special playback data along the track direction in the first embodiment of the present invention.

Next, FIGS. 11A to 11C show a data structure on one track as an example of the tape patterns.

Figure 10B:
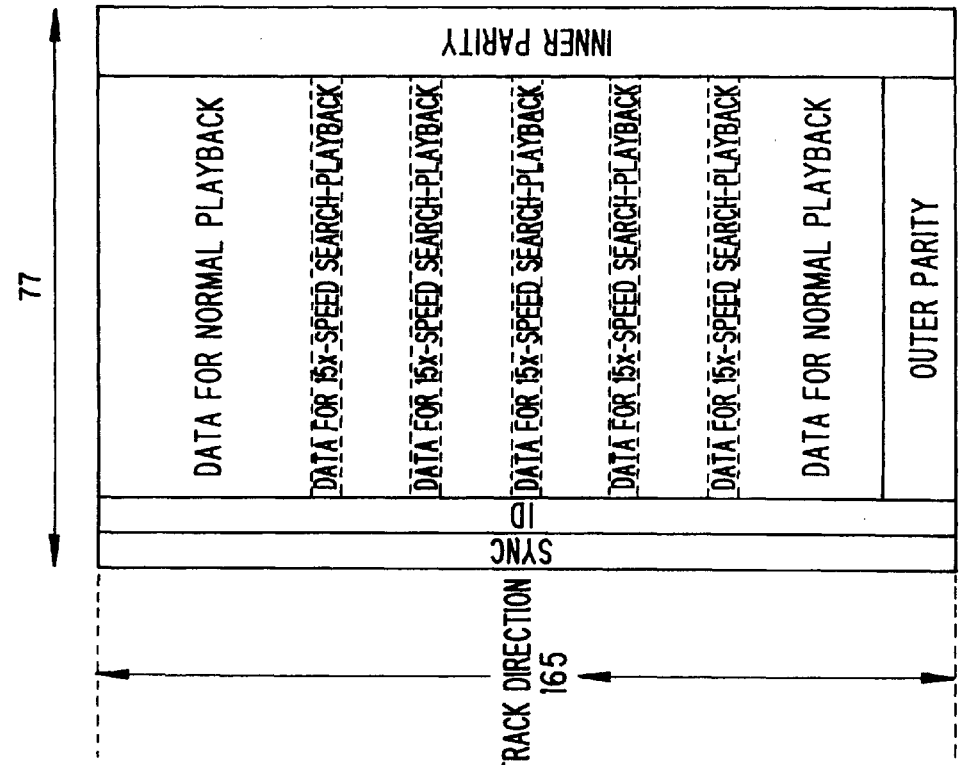
FIG. 10B is a diagram showing a packet structure on a track in the first embodiment of the present invention wherein data on 15×-speed search-playback operation is contained on the track.
Figure 10A:
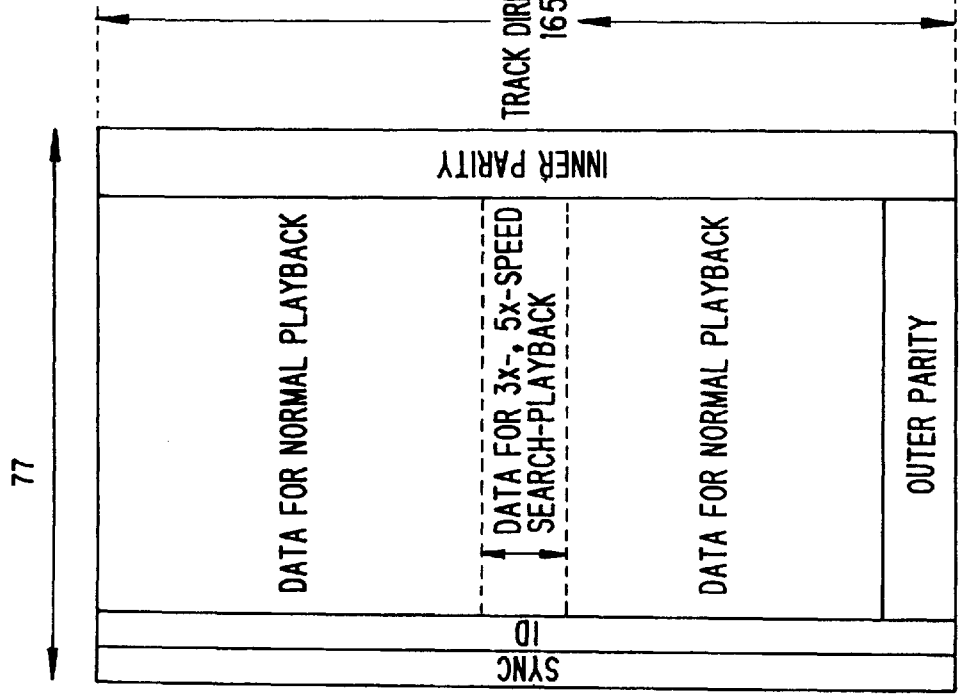
FIG. 10A is a diagram showing a packet structure on a track in the first embodiment of the present invention wherein data on 3×-speed and 5×-speed search-playback operations is contained on the track.

FIGS. 11A to 11C show a structure of data arrangement on one track. In these figures, the data is represented by SB units arranged in the track direction. The data for 5×-speed mode and 3×-speed mode is disposed in an approximately middle portion of the track as shown in FIG. 10A. This arrangement allows the data for 5×-speed mode and 3×-speed mode to be shared. The data for 15×-speed mode is divided into five segments arranged as shown in FIG. 10B.

In the present invention, forward and reverse search playback and two kinds of head arrangement are considered. One of the two types of head arrangement includes two heads arranged on a common substrate like a double azimuth head (the case where a double-chip head is used); the other configuration-on has two heads arranged at radially opposite positions (the case where single chip heads are used).

Figure 12:
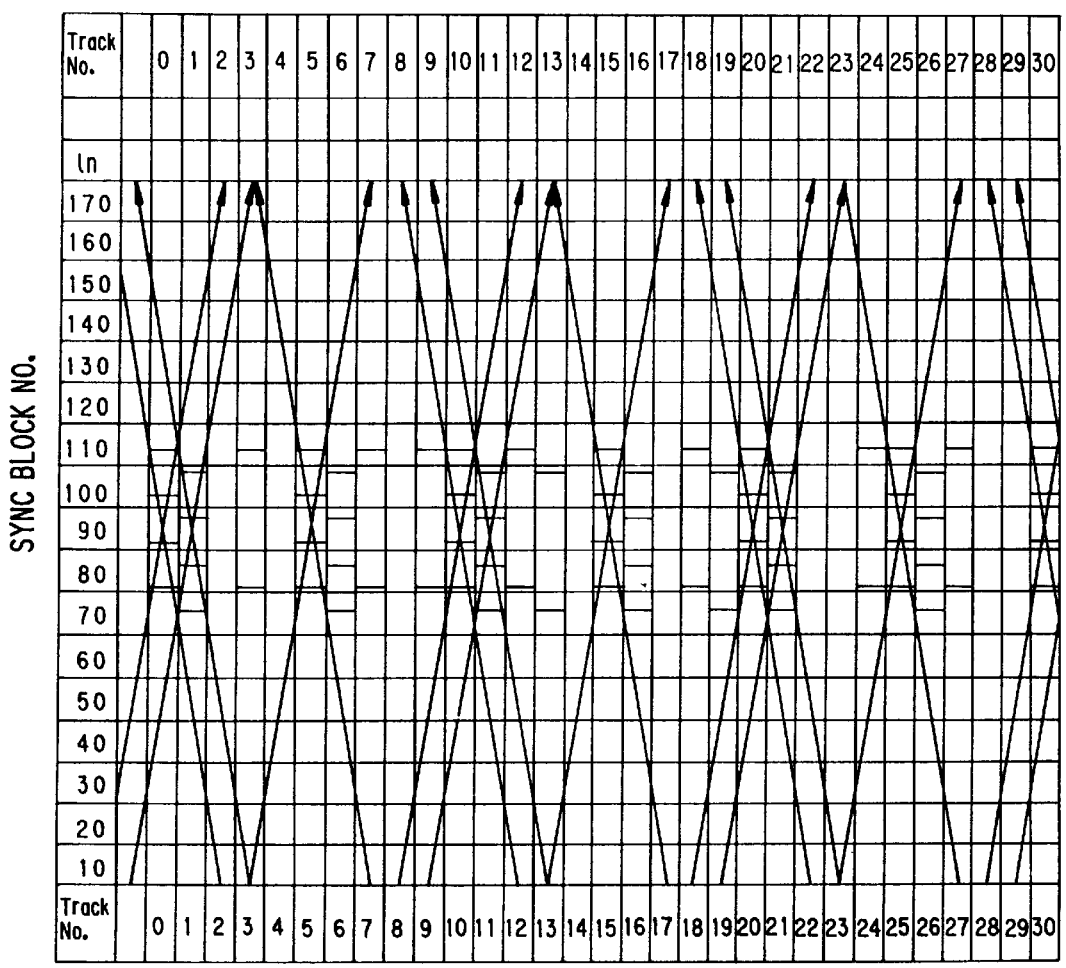
FIG. 12 is a diagram showing a data-layout on the tape for the search-playback operation in the first embodiment of the present invention.
Figure 13:
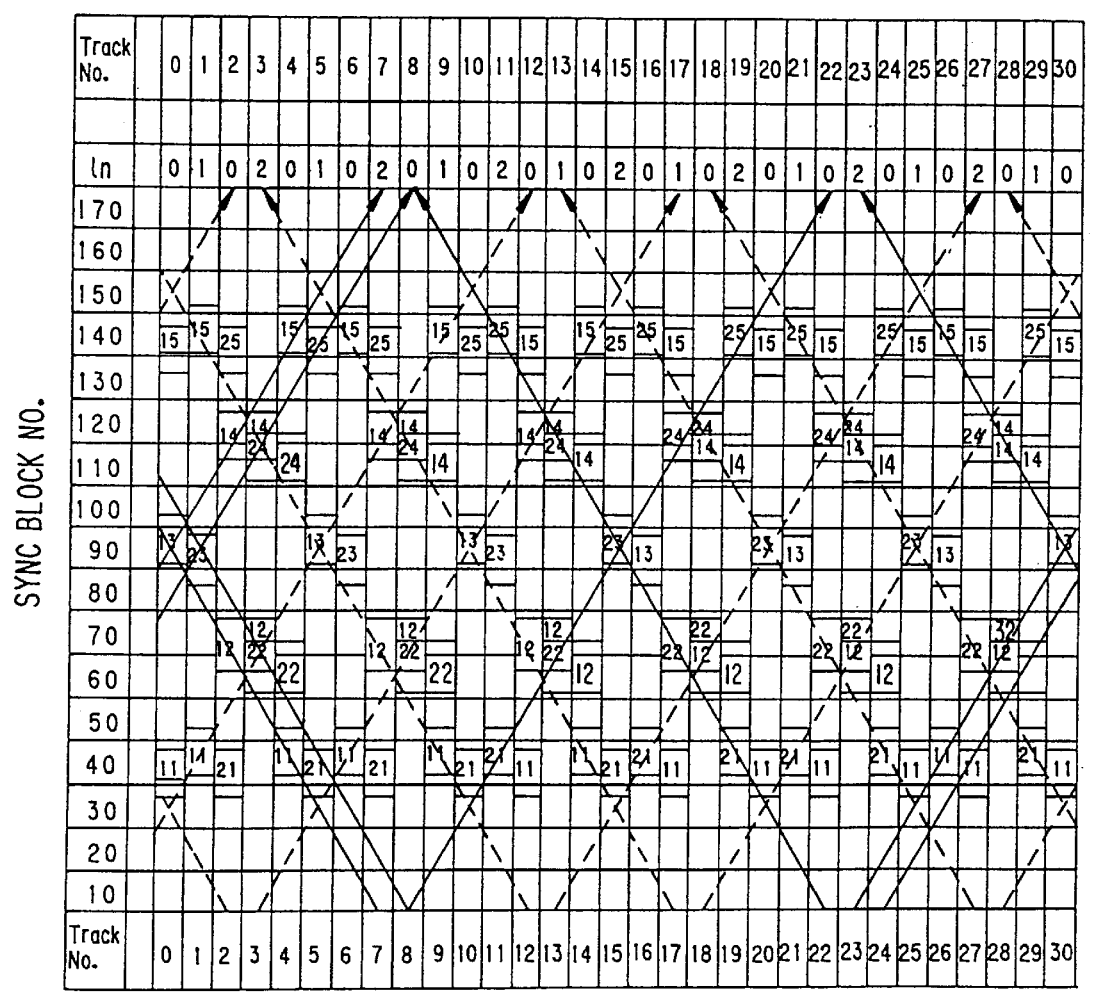
Figure 14:
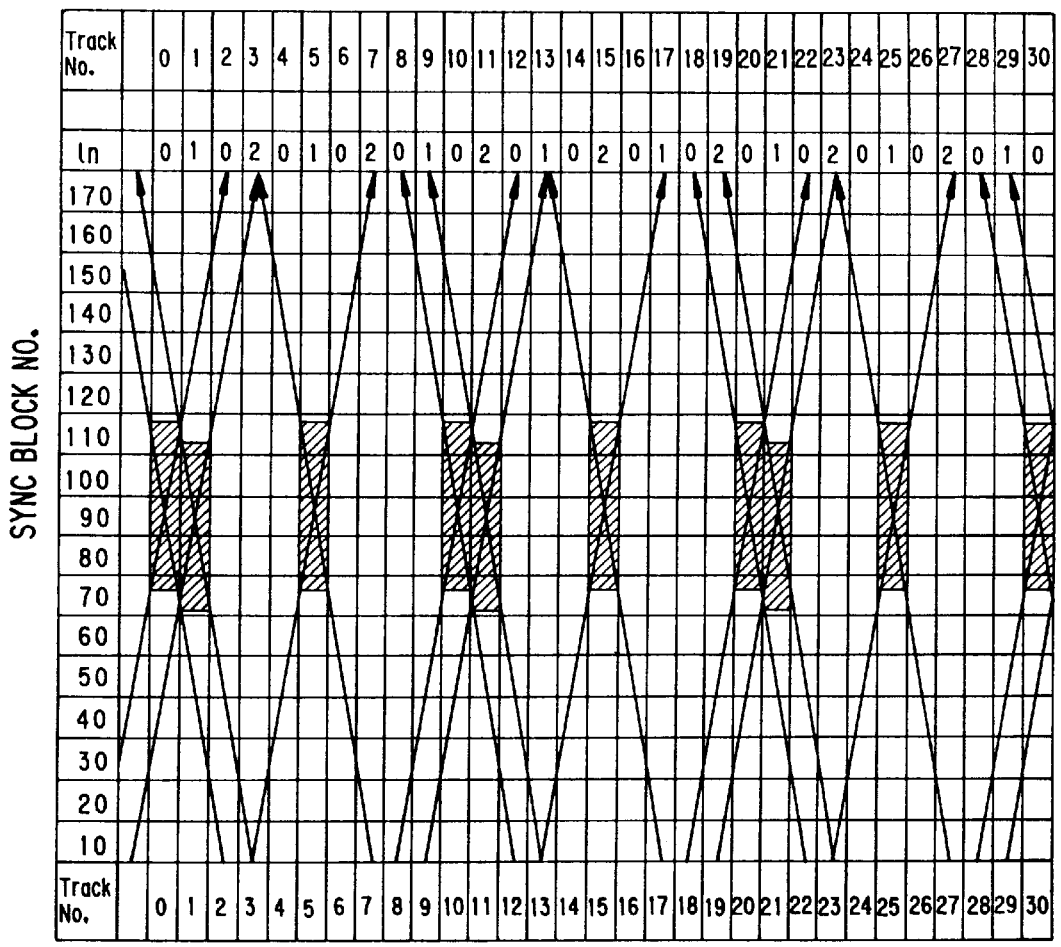
FIG. 14 is a diagram showing head traces for 5×-search-playback operation in the first embodiment of the present invention and a data-layout therefor.

FIG. 12 shows recording areas to be secured, inclusive of 15×-speed mode. FIGS. 13 and 14 show head traces on the tape for 15x-speed mode, 5x-speed mode and 3x-speed mode as well as relations between the traces and positions of data for the corresponding search-playback mode.

TABLE 1

Table 1 shows the number of SBs for total data to be written in for each search-playback mode:

| | |
|---|---|
| Data to be used for only 15x-speed | 132 (1) |
| 5x-speed | 378 (2) |
| Data to be used for only 3x-speed | 292 (3) |
| Total | 802 (4) |

TABLE 2

The amount of data which is read out for search-playback mode:

| | Number of Areas | Number of SBs inside an area | Total number of SBs | |
|---|---|---|---|---|
| 15x-speed | 2 | 12 | 24 | (5) 96SBs because 12 frames make one I-picture |
| 5x-speed | 6 | 40 | 240 | (6) |
| 3x-speed | 10 | 40 | 400 | (7) |
| Total | 18 | | 664 | (8) |

TABLE 3

The amount of data which is available for search-playback:

| | | |
|---|---|---|
| Data rate for SD-VCR input | 24.94 Mbps (9) | 4050 SBs * |
| ATV Bit stream | 19.30 Mbps (10) | 3175 SBs * |
| Difference between the above two (for the search-playback mode) | 5.32 Mbps (11) | 875 SBs * |

* The number of SBs in 30 tracks on condition that data is allotted equally to all the tracks.

$$875 \text{ SBs} > 802 \text{ SBs (4) the remainder; 73 SBs} \quad (12)$$

When factors such as the forward and reverse search-playback operations, the kinds of head arrangement, increasing the number of starting positions for search-playback are to be considered, it is necessary to record duplicated data. As shown in FIG. 12, 30 tracks, i.e., the double of the least common multiple of the multiples of all the search-speed mode, is selected to be the one cycle of the arranging pattern for recording areas. Therefore, even when recording areas for 15x-speed mode is secured at intervals of 5 tracks in order to reduce the locking time for 15x-speed mode, the regions correspond exactly to the recording areas for 5x-speed mode, so that the recording regions can be shared efficiently. Next, a structure of the data for the search modes will be detailed. In a case where data for searching is prepared from the ATV bit stream, suppose that each GOP consisting of 12 frames and only one of them, namely the I-picture is used for the search data, the data for searching is constructed as follows. (Here, the signal component ratio of chrominance signals is 4:1:1, and 120 tracks for 12 frames correspond to one I-picture.)

The number of DCT blocks in a single frame:

$$1,920 \times 1,080/64 = 32,400 \quad (13)$$

Suppose that one byte is allotted for the d.c. component of Y-signal and chrominance signals, one byte is allotted for the two a.c. component coefficients having the lowest frequency, 0.5 byte is allotted for three coefficients having the second-lowest frequency, and the data is allotted equally to 30 tracks. In this case, the number of SBs for the 3x-speed mode search data within 30 tracks is:

$$32,400 \times 1.5/4 \times 2.5/77 = 395 \text{ SBs} \quad (14)$$

$$(<400 \text{ SBs (7), the remainder: 5} \quad (15)).$$

When one byte is allotted for the d.c. component of Y-signal and chrominance signals, 0.5 byte is allotted for the two a.c. component coefficients having the lowest frequency, the number of SBs for the 5x-speed mode search data is:

$$32,400 \times 1.5/4 \times 1.5/77 = 237 \text{ SBs} \quad (16)$$

$$(<240 \text{ SBs (6), the remainder: 3} \quad (17)).$$

When 0.6 byte is allotted averagely for the d.c. component of Y-signal and chrominance signals, the number of SBs is:

$$32,400 \times 1.5/4 \times 0.15/77 = 24 \text{ SBs} \quad (18)$$

$$(=24 \text{ SBs (5), the remainder: 0} \quad (19)).$$

The remaining SBs shown in (15), (17) and (19) can be used for the protection etc., for important data such as the packet header and the like. The ATV includes, other than packet headers, important information such as program-specific information composed of program map tables, program-association tables etc. Therefore, of these important information and the packet headers, data to be protected is previously selected in accordance with the amount of data areas available for the protection under consideration of their importance.

Next, an overall configuration of a second embodiment will be described.

The first embodiment described heretofore has problems as follows. When the normal playback data is to be edited, if, for example, the input data is composed of signals which have been data-compressed based on the MPEG scheme, the editing work must be done by every GOP as a unit or one sequence as a unit, the sequence consisting of several GOPs as a unit. In this case, when a boundary point between two GOPs appears in the middle of a track, it is very difficult from the view of mechanical accuracy and controlling performances to record a next signal from that point at the time of editing. An apparatus having such functions, especially as a general-use VCR, would become too expensive. In a case where a video-program is to be recorded by inserting upon editing, if the displaying time of the video-program on the monitor is equal to the time allotted for the region to which the video-program is inserted, the amount of data could differ from each other. Specifically, if the amount of the data to be inserted is not less than the data amount the region can record, it is impossible to effect the inserting recording. It is sure that an average data rate is determined for the encoders used in the ATV and the MPEG, but the data amount for each of GOP is not clearly specified. If there is too big a difference in data amount between them, a period for blank, or the displaying time allotted for non-display image becomes long. This could cause errors such as under-flow in the buffer of the decoder or discontinuity of pictures on the monitor. In order to avoid this, unnecessary images have to be displayed on the monitor.

Also, recording areas to be used for protecting important parts such as packet headers etc., must previously be set up. Accordingly, if there is much data to be protected, the data to be protected must be selected. On the contrary, if there is no data to be protected, the recording areas secured become useless.

In contrast to this, in the second embodiment, an editable number of frames is taken as a data unit, which is allotted ti an integer-number of tracks, whereby the required control and the like for editing work is simplified. That is, a means for adjusting the amount of data at the time of recording the special playback data, in particular, search-playback data, is provided to control the amount of total data at the stage of recording so that the amount of the total data may correspond to the amount of data which can be recorded in an integer-number of tracks. Therefore, any editing points appear at the beginning of a track, so that there is no need for considering the continuity of servo-signals or the continuity of signals for the operation of the PLL, which should have been considered when editing work such as connectively recording from the middle point of a track is to be done. There is no need for taking measures against such a contingency that signal data to be secured is mistakenly erased due to the lack of accuracy in the interchangeability of mechanisms.

By the aforementioned means for adjusting the amount of the special playback data at the time of recording, it is possible to adaptively set up recording areas to be used for protecting important portions such as packet headers contained in the input signal. That is, after the input bit-stream is allotted to SBs to be recorded in the VCR, SBs containing important portions are recorded as spare data. Upon reproduction, if a certain SB containing important portions cannot be error-corrected, the whole erroneous SB is substituted by the corresponding SBs recorded as spare data. Alternatively, when only important portions such as packet headers are allotted to SBs and if an important portion containing packet header and the like cannot be error-corrected, only the erroneous portion is substituted by the corresponding important portion stored as spare data.

In this way, in the second embodiment, search data is formed based on an ATV signal of, for example, 19.3 Mbps, and two kinds of data, that is, the normal playback data and the search data are recorded in approximately the same positions on the tape. At that time, the amount of the search data is adaptively set up in consideration of the amount of data of GOP obtained from the input bit-stream, then the thus setup data at the recording stage is recorded as a whole onto an integer-number of tracks. Consequently, this schemes does not require complicated control at the recording, which used to be needed for effecting editing work such as connectively recording in which new recording data is to be recorded on the tape having already recorded data so that the former data may be recorded continuously to the latter data. Alternatively, the scheme of the present invention does not require a large interval which used to be taken between the already recorded signal-data and the newly recording signal-data in the conventional method when no control was made. That is, it is possible to record the signal by effectively using the tape without providing a wasteful large interval. Further, since there is no need for improving the accuracy of the mechanism or making a complicated control of the signal as used to be done in consideration of the interchangeability of the tape with editing work (such connectively recording) done, the configuration is suited to mass-production and the like.

When data on a certain video-program is inserted and recorded, it used to be impossible to insert the data if the amount of the data to be interposed is slightly greater than the recording area. In accordance with the present invention, since the amount of the total data is controlled at the recording stage by adjusting the amount of the search data, it is possible to insert a video-program whose data amount is greater than a designated area on the tape. Alternatively, even if the amount of data to be inserted is smaller than the designated area, it is possible to record the video-program without discontinuity. Accordingly, the method of the present invention not only makes it possible to determine whether interposing recording of a certain video-program is feasible by referring to a clock-time indicated during which the video-program is displayed (the clock-time was unreliable so that it was impossible to rely on), but also enables an actual interposing recording operation. Further, in the conventional configuration, it was impossible to determine whether a certain video-program could be interposed until the whole video-program was actually received since the amount of signal data to be inserted could not be known at the end of the reception. Specifically, when the amount of the recording data to be inserted is greater than the designated inserting area, data in excess of the designated inserting area has to be abandoned. However, by the method of the present invention, if a required time of a certain video-program or a part of it to be inserted can be known from, for example, a broadcasting program schedule table, it is possible to effect editing work inclusive of connectively recording.

Further details of the second embodiment of the present invention will be described. The second embodiment will be explained as compared with the digital VCR described in the above first embodiment.

Figure 15:
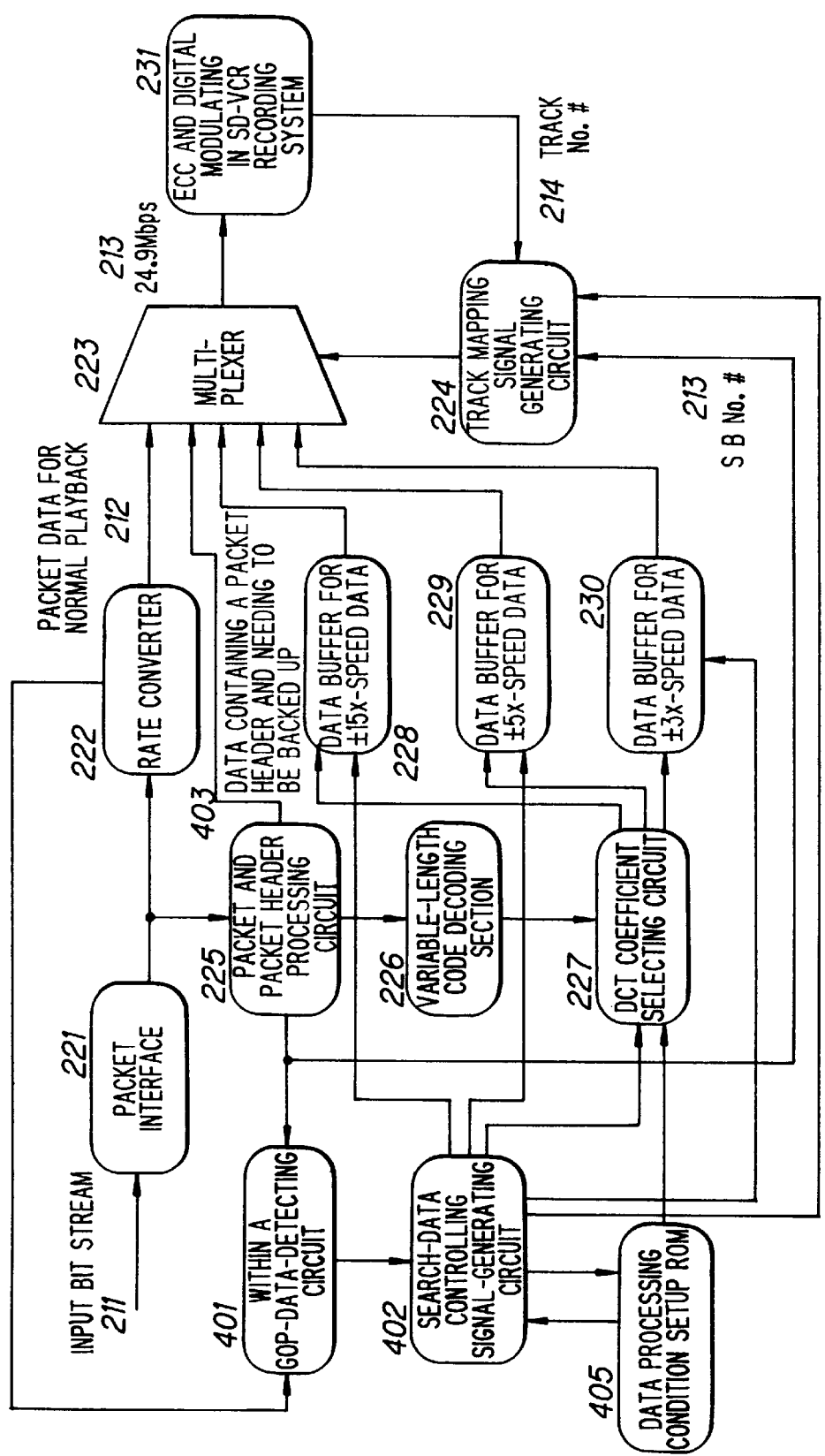
FIG. 15 is a block diagram showing a recording system of a second embodiment of the present invention where the ATV bit stream is inputted.
Figure 16:
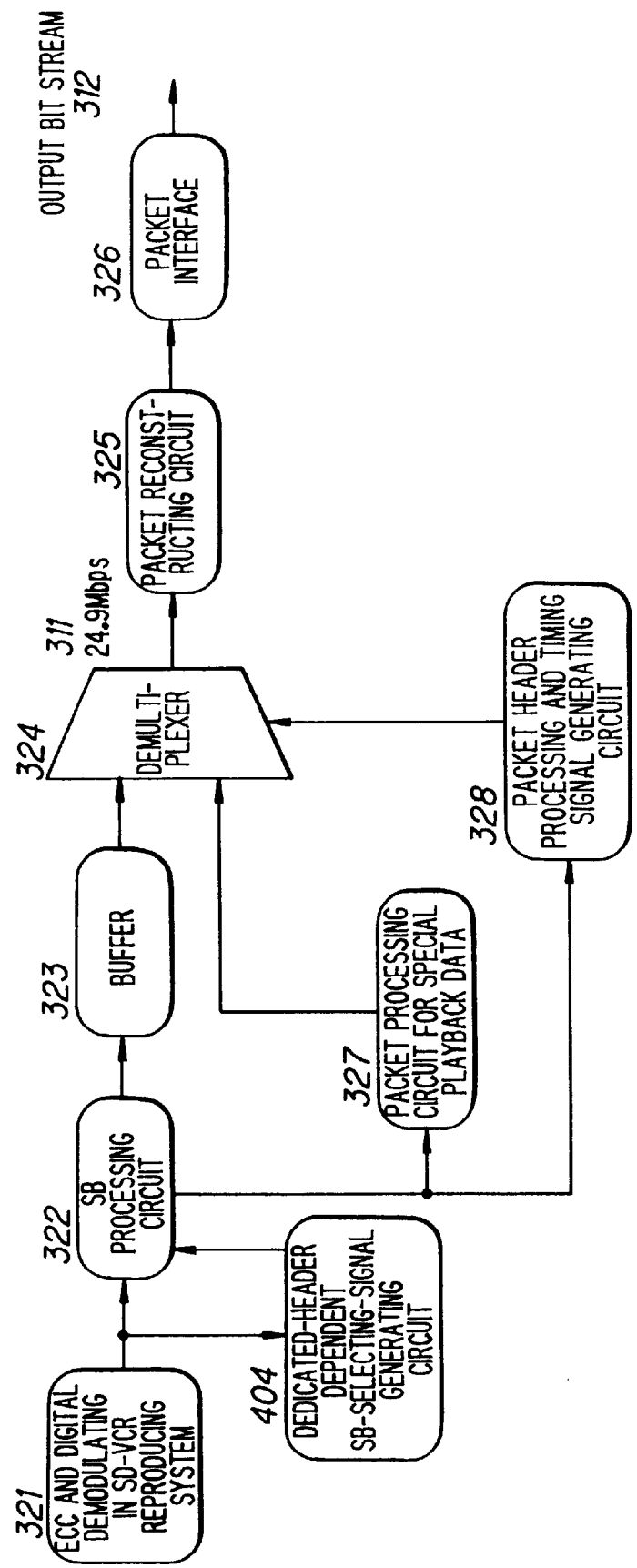
FIG. 16 is a block diagram showing a reproducing system of the second embodiment of the present invention where the ATV bit stream is inputted.
Figure 17:
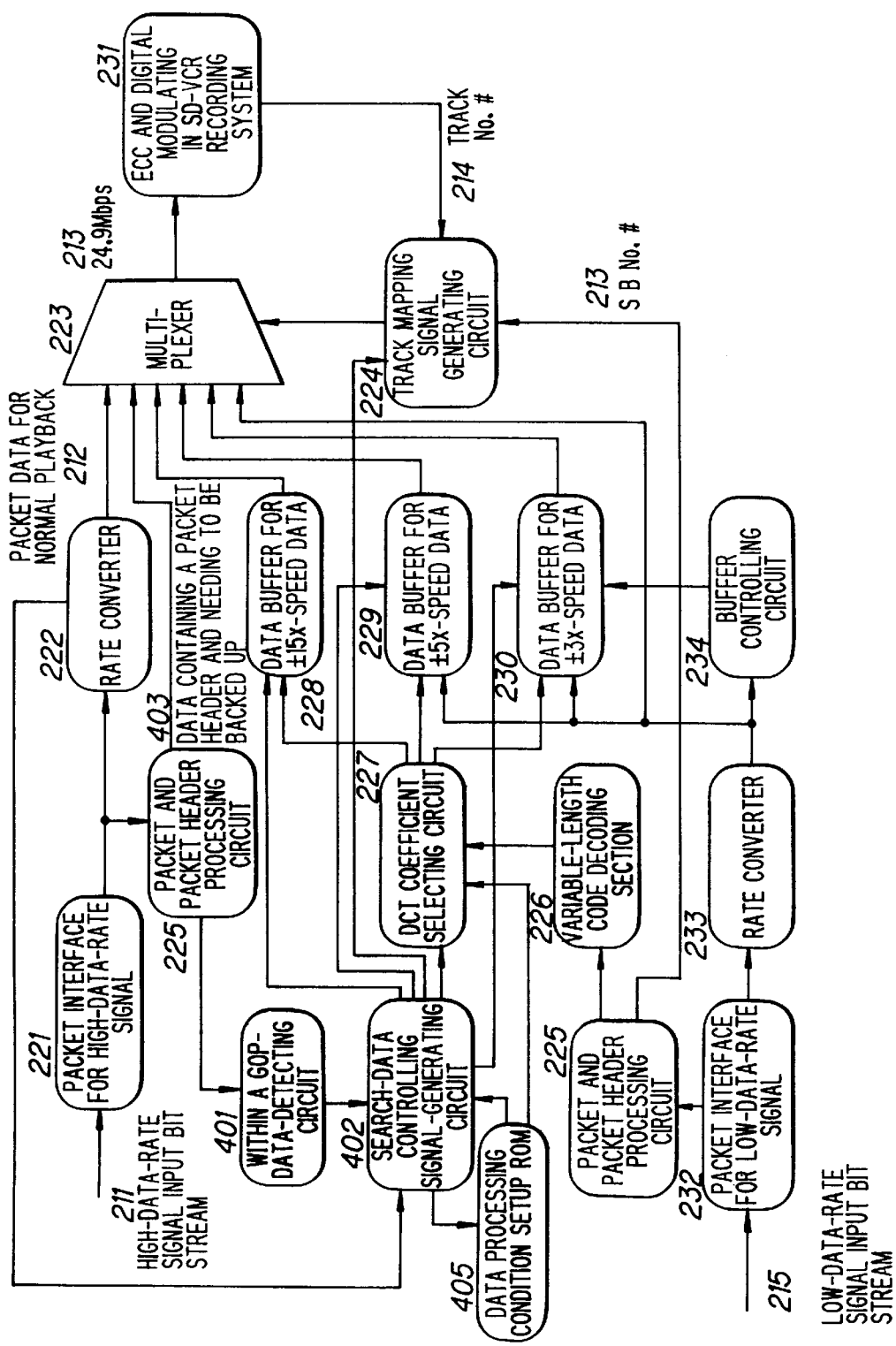
FIG. 17 is a block diagram showing a recording system of the second embodiment of the present invention where high-data-rate and low-data rate signals are simultaneously inputted.
Figure 18:
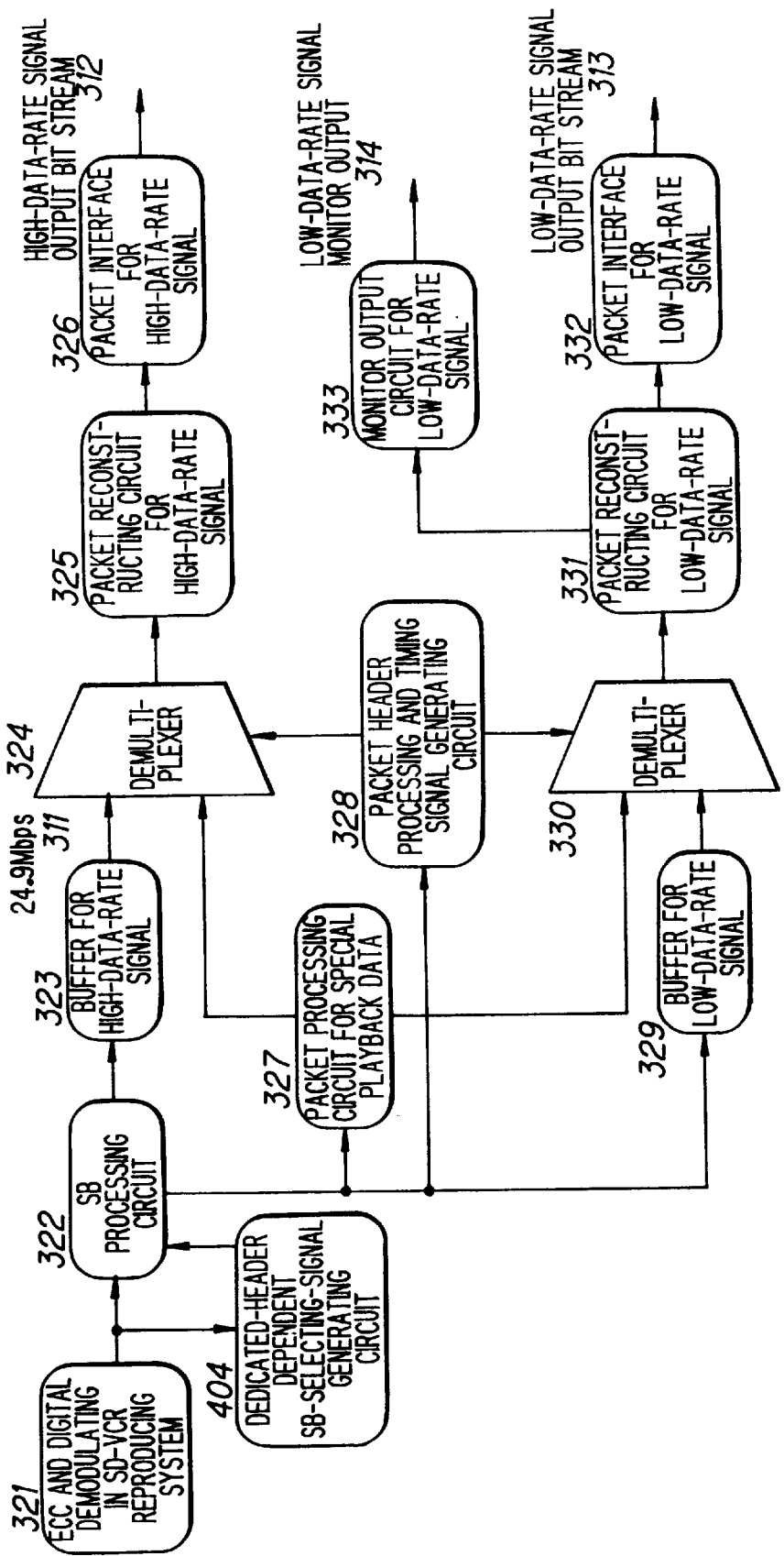
FIG. 18 is a block diagram showing a reproducing system of the second embodiment of the present invention where high-data-rate and low-data rate signals are simultaneously inputted.

FIGS. 15 and 17 show block diagrams of a recording part of this embodiment while FIGS. 16 and 18 show block diagrams of reproducing part of the same. The difference from the configuration of the VCR in the first embodiment (shown in FIGS. 6 through 9) is that a circuit 401 of detecting the amount of data inside a GOP (to be referred to as a within a GOP-data-detecting circuit 401) and a signal generating circuit 402 for controlling the amount of search-data (to be referred to as a search-data controlling signal-generating circuit 402) are provided on the recording side while a SB-selecting-signal generating circuit 404 by detecting a dedicated header (to be referred to as a dedicated-header dependent SB-selecting-signal generating circuit 404) and a data processing condition setup ROM 405 are provided on the reproducing side.

The present invention will not be limited to the SD-VCR system. That is, the present invention is independent of the error correction codes (ECC), the digital modulating and demodulating scheme, the cassette type, the mechanical configuration and the servomechanism. Any digital input can be processed and any digital VCR can be used as long as the data rate of the input can be adjusted and the packet format can be converted. The embodiment will be described by exemplifying the SD-VCR.

This embodiment can be applied to both cases where an ATV bit st:ream is inputted as a high-bit rate signal and special playback data is prepared from the ATV bit stream (see FIG. 15 for the recording side and FIG. 16 for the reproducing side) and where both a high-data-rate bit-stream and low-data-rate bit-stream are inputted as input and special playback data is prepared from the low-data-rate bit-stream (see FIG. 17 for the recording side and FIG. 18 for the reproducing side). As basic operations as to the embodiment are the same between the configurations in FIGS. 15 and 17 and between the configurations in FIGS. 16 and 18, description will be made on only the configurations shown FIGS. 15 and 16.

Initially, the operations of the recording side (FIG. 15) will be described. The ATV bit stream inputted, after passing through the interface, is inputted to the (GOP-data-detecting circuit 401 where the amount of data within each GOP is counted. Then, the search-data controlling signal-generating circuit 402 checks the overflow/underflow condition in the buffer and outputs an amount of acceptable search-data corresponding to the detected condition. That is, the circuit 402 has predetermined information in which the amount of acceptable search-data is defined in association with each of different buffer-conditions as to overflow and underflow. Based on the search-data amount thus designated, a DCT coefficient selecting circuit 227 selects an appropriate number of search data for each of the search-speed modes which is previously set up (here, there are three search-speed modes). A track mapping signal generating circuit 224 generates a control signal for controlling a multiplexer 223 so that when the multiplexer multiplexes different kinds of data, i.e., the normal playback data, ±15x-speed data, ±5x-speed data, ±3-speed data and data for backing up packet headers, each of these data may be recorded in place on the tracks. The information on the timings of switching is formed by the search-data controlling signal-generating circuit 402.

The aforesaid search-data controlling signal-generating circuit 402 generates a data amount controlling signal, based on the data amount (for each of the different data) previously designated in the data processing condition setup ROM 405.

Further, the aforesaid search-data controlling signal-generating circuit 402 has another function. That is, based on the acceptable search-data amount previously determined in the ROM 405 for each of different search-speed modes, the circuit 402 generates control signals for controlling different data buffers for different speed modes. In the track mapping signal generating circuit 224, allocation of the search data is previously set up in association with the amount of search data. The circuit 224 generates output signals to control the multiplexer 223 and properly allots SBs so that data patterns on the tape may be formed adaptively in association with the detected amount of the search data.

Upon the reproducing operation, as shown in FIG. 16, at both the normal playback mode and the search-playback mode, the dedicated-header dependent SB-selecting-signal generating circuit 404 distinguishes SBs based on the dedicated header of one byte data newly provided. A SB data processing circuit 322, based on the type of the data, properly effects switching so that SBs of the normal playback data are outputted to the buffer 323 while SBs of the search-playback data are outputted to a special-playback-data packet processing circuit 327 and a packet header processing and timing signal generating circuit 328. FIG. 20 shows a configuration of the dedicated header but the detail will be explained later. Thereafter, the data picked up at the search playback is reconstructed into data having a packet structure which can be decoded by the ATV decoder.

Referring next to FIGS. 19A to 19C, data allocation of ATV packets to SBs in this embodiment will be described by explaining an example in which the internationally agreed SD-VCR 5-s used. Two data packets (188 bytes×2=376 bytes) on the ATV bit stream are allotted to five SD-VTR SBs (77 bytes (effective area)×5=385 bytes) and recorded in that form. Of the remaining nine bytes, one byte for each SB is used for the aforementioned dedicated header as shown in FIGS. 19A to 19C. Remaining four bytes for each of five SBs is filled up with pattern data as stuffing bytes which can be recognized as dummy data. Alternatively, it is also possible to use the space for storing data for other purposes.

FIG. 19A shows a case where two bytes of the remaining four bytes are inserted into the SB. The way of the inserting is written in the aforementioned dedicated header so that the inserted portion can be recovered into the normal bit stream at reproducing. FIG. 19B shows an example of SD-VCR SBs of the data for the special playback. The method of allocation of the input bit stream to the SD-VCR SBs is not limited to the above example.

Now, description will be made on a case where GOPs on the input bit-stream of the invention are picked up one by one and data on each of the thus picked GOPs is recorded onto a fixed number of tracks. In a case where the NTSC signal (frame frequency: 59.94 Hz) is recorded into the SD-VCR; if the drum is rotated at 150 rps (9000 rpm), data on each frame is assigned to ten tracks. That is, the frame number in a GOP multiplied by 10 tracks/frame becomes the fixed number of tracks. For example, if one GOP is composed of 12 frames (description will hereinafter be made by exemplifying this case, that is, the GOP is of 12 frames), the corresponding number of tracks is 120. Therefore, data processing conditions are set up so that the total data, inclusive of the search data can be allotted to the 120 tracks. These conditions are defined in the data processing condition setup ROM 405. FIGS. 21A to 21C show the manners of data storage. In FIGS. 21A to 21C, a bidirectional arrow designates a region of data on a GOP.

Now, description will be made on a case where the input bit stream of the invention is processed per a GOP as a unit and data on each GOP is recorded onto an arbitrary-integer number of tracks. If the increment of the amount of the input data is a half or less of the number calculated by subtracting the number of SBs used for the search data on a track from the total number of SBs in the track, the SBs secured for the search data is reduced by the thus calculated number of SBs, whereby it is possible to inhibit the increase of the number of tracks. On the other hand, if the increment of the amount of the input data is more than a half of the number calculated by subtracting the number of SBs used for the search data on a track from the total number of SBs in the track, the number of SBs for the search data is increased so as to use another track.

When the amount of the input data decreases, a similar operation is made. That is, regardless of the increment or the decrement, the number of recording tracks used for the frame number of a GOP is kept at an integer by increasing or decreasing the amount of the search data. Consequently, there is no invalid data in the data within tracks, so that efficient use of the recording areas on the tape can be improved.

Figure 22B:
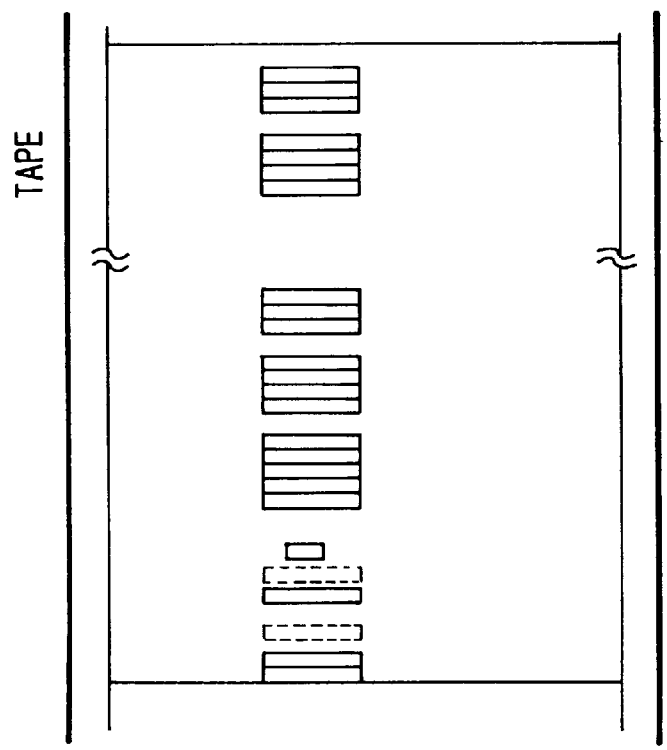
FIG. 22B is a diagram showing a manner of adjusting the amount of search data in recording areas of GOP data on the tape in the second embodiment of the present invention, wherein the amount of data is adjusted using first three areas (a large area is of 40 SBs; a small area is of 20 SBs and a dot-lined area has no data)
Figure 22A:
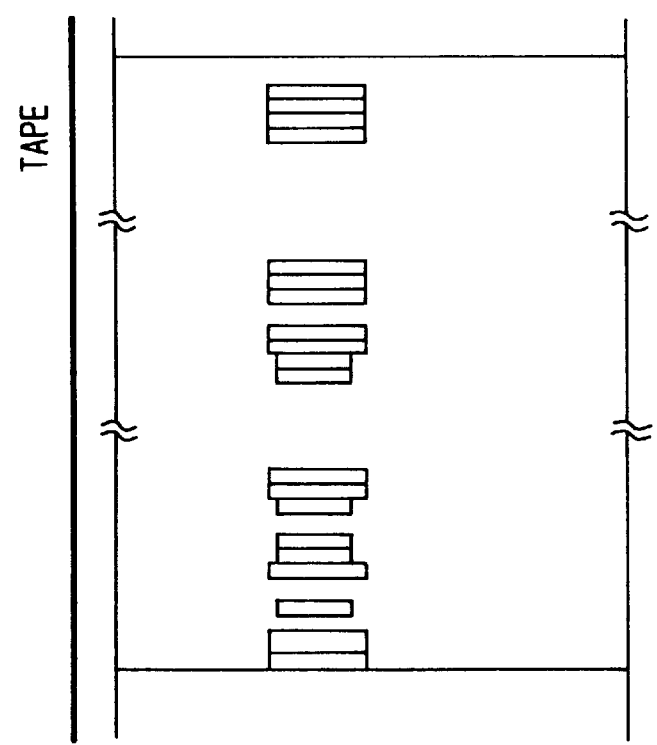
FIG. 22A is a diagram showing a manner of adjusting the amount of search data in recording areas of GOP data on the tape in the second embodiment of the present invention, wherein the amount of data is adjusted using first 50 areas (a large area is of 40 SBs and a small area is of 38 SBs)

As to the arrangement of the data, the amount of the total data is adjusted by increasing or decreasing the recording areas for 3x-speed search mode data. FIGS. 22A and 22B show an example of the case. Since the valid playback data for 15x-speed mode is less in number, the quality of images is greatly affected if the amount of the data is varied. Accordingly, even when the amount of data is varied in a large degree, the data amount should be regulated by adjusting the amount of the data for at most 3x-speed mode and 5x-speed mode, in this embodiment.

When the amount of actually prepared search data is adjusted to the amount of the search data thus calculated as above, there is no need for effecting the adjustment in a precise manner. The actually prepared search data may be useful if the amount of it falls within the calculated value, and the difference as much as some tens of bits can be accepted for the practical operation.

As is apparent from the scheme described above, recording at editing is done one GOP as a unit or one sequence consisting of some or several GOPs as a unit. At that time, data on a GOP or a sequence as a unit is recorded onto an integer number of tracks. This increases a margin of the accuracy for the device mechanism and makes the control easy.

More specifically, in the case where recording for editing is started from the middle of a track, it is necessary to improve the accuracy of the absolute position of the attachment of the head, to precisely adjust the absolute position of the PG pulse, and to retrieve the signal to control the timing of recording. Further, in order to maintain the interchangeability, a further precision is required. Even with such precision enhanced to the greatest degree, it is impossible to effect completely continuous recording.

Figure 23B:
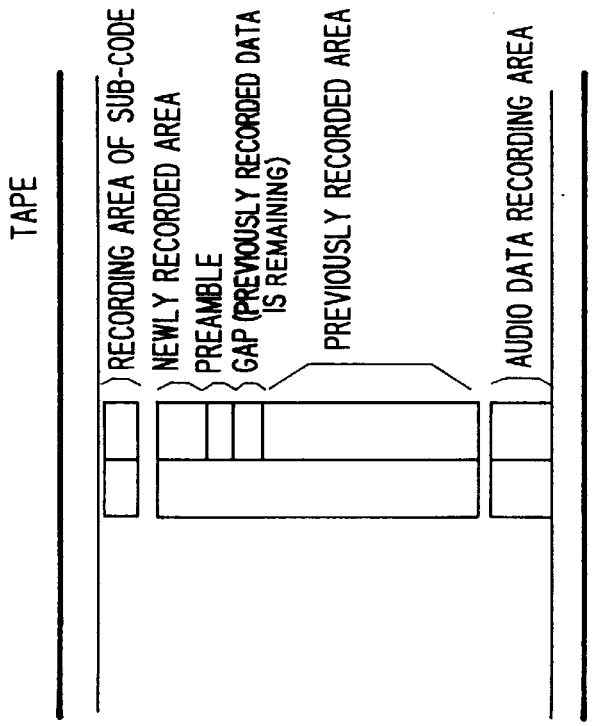
FIG. 23B is a diagram comparatively showing conditions of editing points in connectively recording as compared with the embodiment shown in FIG. 23A.
Figure 23A:
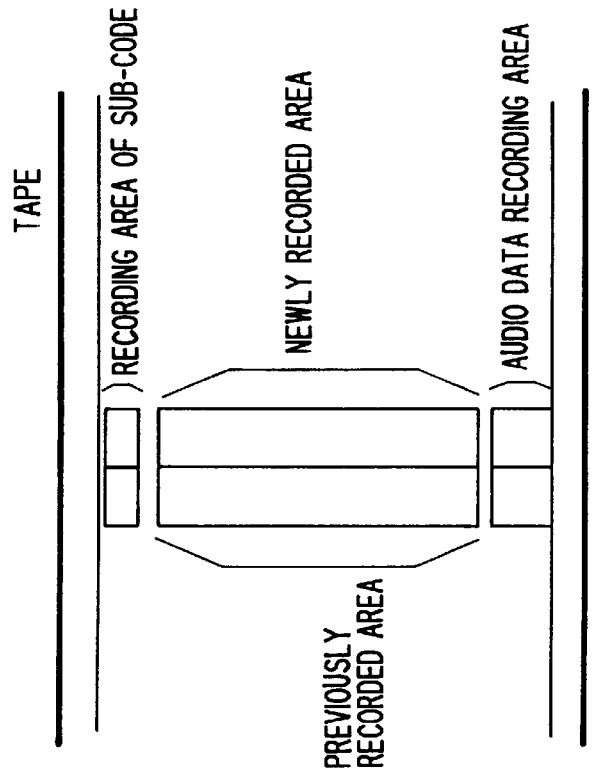
FIG. 23A is a diagram showing conditions of editing points in connectively recording in the second embodiment of the present invention.

Moreover, since the signal varies in phase at the editing point, it is better to provide a preamble etc., in view of the operation of the PLL. Accordingly, it is impossible to eliminate the wasteful portion between the point from where new data is desired to start and the point from where the new data is actually recorded. FIG. 23B shows this situation. In this figure, the gap and the preamble are the wasteful portion to be given only for the connective recording.

When the end of the GOP is midway on a track, the problem stated above can be avoided if the recording for editing is forced to start from the next track. This method, however, increases the wasted part except in the case where a SB containing the end of the GOP falls in the end of the track.

If a fixed number of tracks are allotted to the normal playback data of a GOP unit, the amount of the search data has to be varied by the variation in the amount of the normal playback data. That is, if the amount of the normal playback data includes 3175 SBs within 30 tracks as stated in the example of the conventional system, the amount of the search data in the 30 tracks could vary by a maximum of 64 SBs (which is about 2% of the input data and corresponds to a 0.47 track). Hence the quality of image at the search mode may greatly be affected.

In a case where the number of tracks is varied, but kept at an integer number; suppose that the amount of the last search data in a GOP is, for example, 40 SBs and since the amount of valid data for video signal on one track 135 SBs, a number is set up which is calculated as follows, as a threshold:

(135−40)/2=47.5 SBs.

In this situation, if, for example, the data on the normal playback increases by 47 SBs above the usually recordable data amount for an integer number of tracks, the amount of the search data is reduced by 47 SBs to thereby inhibit the increase of tracks in number and if the data on the normal playback increases by 48SBs, one track is added and the amount of the search data is also increased by 47 SBs (135−40−48). Accordingly, the variations of the amount of the search data can be inhibited within 47 SBs, the quality of image at the search mode will not vary to a great extent and little degradation will be noticed by the observer.

When this control is effected; if there successively appear many GOPs each of which contains an increased amount of data by (48+n) SBs (n=0, 1, . . . , 47) above the usually recordable data amount for an integer number of tracks and therefore each of the GOPs is increased as to the search data by (47−n) SBs, the data for the normal playback cannot be read out from the VCR input-side buffer within a time which corresponds to the increased period by the SBs for the search data and this unretrieved data builds up in the buffer. This occurs because the amount of input data should be increased as one track is added, but only the search data is recorded in the remaining part of the track added and recording of the data on the next GOP must wait until the next track comes up. Accordingly, the unretrieved data is piled up in the buffer, possibly causing the VCR input-side buffer to overflow. Therefore, a device for monitoring the overflow state in the VCR input-side buffer is provided so that, if the data in the buffer is about to overflow, the apparatus can be forced to cut down the search data and lessen the number of recording tracks to thereby speed up the retrieval of the data in the buffer even when the above increment of data is 48 SBs or more.

If there successively appear many GOPs each of which contains an increased amount of data by 1 SB to 47 SBs above the usually recordable data amount for an integer number of tracks, this could cause the VCR input buffer to underflow. In such a case, the operation is controlled so that one track is forcibly added in contrast to the above case.

In the case where the amount of data decreases, the operation is controlled in an analogous manner. That is, if there successively appear many GOPs each of which contains a decreased amount of data by m SBs (m=0, 1, . . . , 47) and therefore each of the GOPs is increased as to the search data by m SBs so as not to decrease the number of tracks, the apparatus is controlled to prevent the overflow of the data. In contrast, if there successively appear many GOPs each of which contains a decreased amount of data by (48+m) SBs and the search data is cut down by (47−m) SBs so as to reduce one recording track, the apparatus is controlled so as to prevent the underflow of the data.

Further, when the case in which the data increases by m SEs alternates with the case in which the data decreases by (48+m) SBs, the apparatus is controlled to prevent the underflow. When the case in which the data increases by (48+m) SBs alternates with the case in which the data decreases by m SBs, the apparatus is controlled to prevent the overflow.

Since, in the actual operation, the data rate of the input is controlled to converge to a constant data rate in a sufficiently long time, a similar tendency will rarely occur continuously across many GOPs. Nevertheless, if an unusual state happens such as a scene change, the above condition could occur locally.

In such a case, the maximum variation in the amount of the search data is as follows when the same value as in the above is exemplified:

135−40=95 SBs.

As to the input data, since the amount of data for each GOP on average converges to a certain value, the above trouble will not occur as long as the VCR input buffer has a sufficient capacity. However, in view of the cost, it is preferable that the capacity of the buffer is lessened, so that it is better to select a less expensive method by comparing the cost of the buffer with the controlling circuit described above.

Although the amount of the search data is specified as 40 SBs in the above description, any other value can be used. Further, this value can be varied for each track. That is, if the amounts of the search data differ depending on tracks, the values can be previously set up in the data processing condition setup ROM 405 so that it is possible to easily deal with processing as above.

As to the operation at recording thus explained heretofore, the basic operation will be detailed with reference to a specific example. (This example will not limit the present invention.)

In the beginning, previously set up in the data processing condition setup ROM 405 are an amount of the data for a GOP on the input bit stream, a threshold which is determined in association with the amount of the data and based on whether the number of tracks should be increased or decreased is determined, a number of recording tracks and an amount of the search data. As to the input data stream, the data amount is counted for each of GOPs. Then, the operation is followed by checking the flag which indicates the state of the VCR buffer to confirm if either overflow or underflow occurs, and retrieving the number of recording tracks and the amount of the search data, both determined based on the threshold, from the data processing condition setup ROM 405. A required and suitable amount of the search data is prepared from the input bit stream. The data buffers 228, 229 and 230 for different speed modes are used to prepare data for different search playback modes in the following manner. That is, data used for preparing the aforementioned search data, is composed of coefficients of the d.c. component of the DCT coefficients decoded by the variable-length code decoding section 226 and the a.c. components (when one DCT block is composed of 8×8 pixels, there are 63 a.c. components, though many of which is "0"). Of these data, a required number of d.c. components and a.c. components for each of the search-speed modes are selected in the DCT coefficient selecting circuit 227. Upon the selection, the selecting values of d.c. components and a.c. components for different search-speed modes are set up based on the setup values in the data processing condition setup ROM 405. Thereafter, mapping of the data onto the tape is effected. In the mapping, the data for the normal playback and the search data are registered in place on the tape. The input data is delayed as required.

Figure 24A:
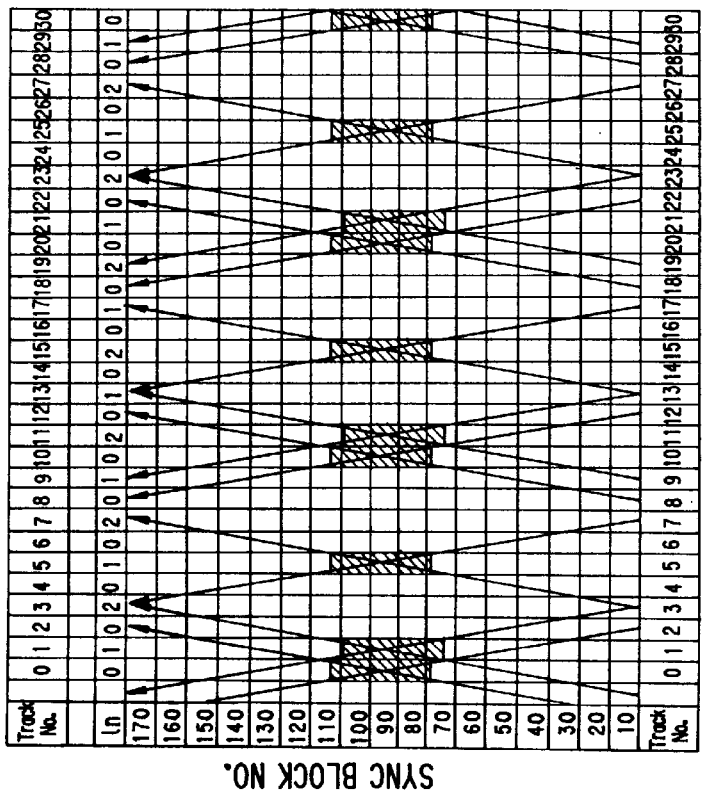
FIG. 24A is a diagram showing head traces for search-playback operation when the amount of search data varies in the second embodiment of the present invention and a data-layout therefor, wherein each unit of search data is increased by 5 SBs.
Figure 24B:
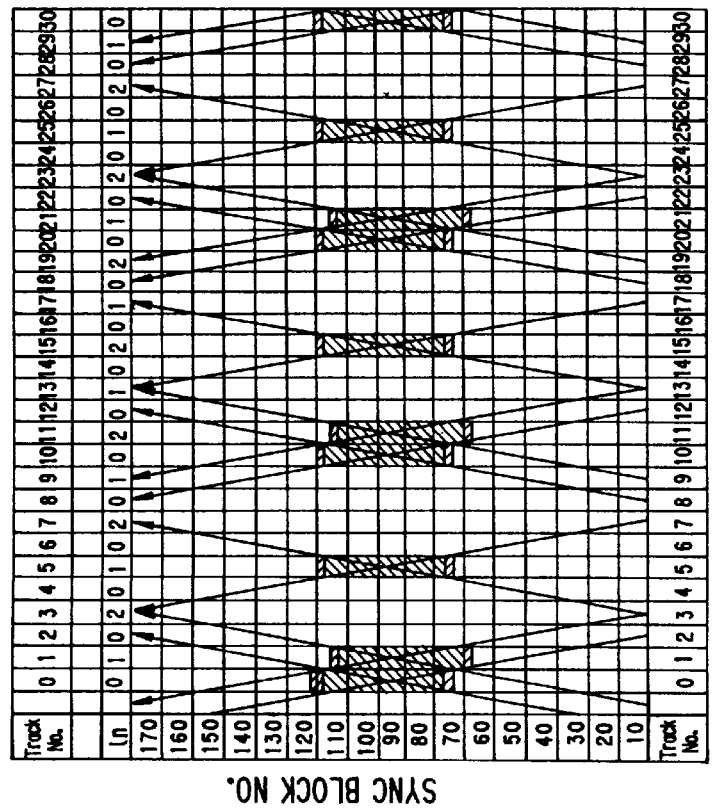
FIG. 24B is a diagram showing head traces for search-playback operation when the amount of search data varies in the second embodiment of the present invention and a data-layout therefor, wherein each unit of search data is reduced by 5 SBs.

Referring next to an example shown in FIG. 12, explanation is made of the method of modifying the amount of the data for each search-speed mode on condition that the data becomes effective when the amplitude of the data is equal to or over half of that in the normal playback operation. FIGS. 24A and 24B show the ways of the modification. FIG. 24A shows a case where each of the search data is increased by 5 SBs and FIG. 24B shows a case where each of the search data is reduced by 5 SBs. These figures are based on the example of the tape pattern for 5×-speed mode shown in FIG. 14, in which ±5 SBs are modified for each of search data areas (there are nine recording areas in this example).

In 120 tracks (GOP is to be made up of 12 frames), the number of SBs is:

$$9 \times 5 \times 120/30 = 180 \text{ SBs.}$$

Data of this amount is modified. Of course, the number of SBs to be increased or decreased may change case by case, or the number of SBs to be changed could vary depending on each track.

A large variation of the data amount like this is liable to occur especially when the whole scene changes.

In the above exemplified VCR, since all the search data areas for 3×-speed data are picked up at 3×-speed search mode, the resulting effect does not vary between the case where the amount of data is varied in many different distributed search-data areas as above and the case where the amount of data is varied in neighboring few tracks.

In the case of 15×-speed mode in this example (FIG. 13), since the search data for 15×-speed mode is arranged at intervals of 5 tracks in view of servo lock; if the head starts 15×-speed search operation from a certain track, the head does not pick up the data on the first and second coming-up tracks by counting every five tracks. In case, for example, such an operation is effected also for the data for 3×-speed search; if the adjustment of the amount of the search data, as stated above is effected in one specific track, the quality of image displayed in the search mode would become different depending on the track from which the search is started.

In order for the data for a particular forward (or reverse) search-playback not to be decreased in the double-chip head arrangement (or in the arrangement of the single-chip heads), the amount of the search data to be varied is preferably allotted equally to, at least, a plurality of tracks.

If the amount of data to be varied is as small as a few SBs and therefore the variation in the data amount causes little effect on the quality of searching pictures, the change of the data amount may be made concentratively on any tracks.

Since, in reproducing at any playback mode, the reproduced data must be classified at the SB-level into data for search modes and data for the normal playback, dedicated headers are required for that purpose. In the embodiment of the invention, one byte of the valid data area in one SB, e.g., 77 bytes is to be allotted to the dedicated header. Therefore, the usable area in the SB is 76 bytes.

FIG. 20 shows a configurational example of the dedicated header for the purpose. The first three bits in the dedicated header are used to indicate the classification of the SB, that is, the normal playback data, 3×-speed search data, 5×-speed search data, 15×-speed search data or user-defined data. The next three bits are used to indicate the amount of spare data in the SB. The remaining two bits, one for each, are used to indicate the starting SB of a GOP and the ending SB of a GOP. The dedicated header is not limited to the above configuration. That is, the dedicated header should be constructed so as to meet the scheme of corresponding the input bit stream to SBs.

Based on the amount of data calculated in (1) through (19) in the first embodiment of the invention, the second embodiment will be described. Suppose that a GOP is composed of 12 frames, the SD-VCR writes the data onto 120 tracks during which the SD-VCR displays 12 frames of images.

At first, description will be made on a case where GOP data is written in on a fixed number of tracks, e.g., 120 tracks. If, for example, the amount of data of a GOP on the input signal decreases by 100 SBs, 100 SBs should be cut down only from the data for 3×-speed search mode. That is, in this example, the data for 3×-speed search mode is cut down from 292 SBs secured for the mode to 192 SBs. Since the track pattern for the search-mode data in this case has a cycle of 30 tracks; with 30 tracks considered as a unit, the data on 30 tracks should be reduced by 25 SBs (100 SBs divided by four). Accordingly, for example, 2 SBs are cut down from each of first ten tracks and 1 SB is cut down from each of next five tracks.

In this case, the varying amount can be allotted to both bidirectional search data responsive to the double-head arrangement and responsive to the single-chip head arrangement. Hence, referring to FIG. 25, the amount of data which can be retrieved and used at the searching operation by one of the head arrangements is calculated as follows:

$$400 - (100 \times 10/15) = 333 \text{ SBs} \qquad (20).$$

(When the result contains decimal, the decimal is cut off.)

In this case, since the number of SBs must be divided by four, there occur some cases in which the number is indivisible. In view of such indivisible cases, the controlling circuit becomes large. To avoid this, let us omit the dividing process and consider the data varying process to be done for every 120 tracks which correspond to a GOP. Then, the amount of data to be reduced is allotted to 60 tracks in which the search-data areas for only 3x-speed mode exist. That is, 1 SB is cut down from the search data on each of the first 20 tracks and 2 SBs are cut down from the search data on each of the remaining 40 tracks.

The allocation of the data is not limited to the above method. For example, with 120 tracks considered, it is also possible to cut down 2 SBs from each of the first 50 tracks which contain the search data. Alternatively, it is possible to cut down 100 SBs from last few, for example, three tracks. FIGS. 22A and 22B show the manners of the data adjustment.

When the data amount to be varied is as such, it is possible to deal with the data reduction by adjusting only the search data for 3x-speed mode, without the necessity of adjusting the search data for 5x-speed mode. However, as the varying data amount further increases, the search data for 5x-speed mode should and can be used to effect the adjustment as to the data amount.

Next, description will be made on a case where an unfixed number of tracks are used to record the GOP data with the number of tracks varied by an integer-number of tracks. As in the above example, it is assumed that the GOP data increases by 100 SBs. Suppose that a 121st track contains 40 SBs of the search data; even if all the 40 SBs are cut down, there is still a shortage of 60 SBs. Since this deficiency in amount is greater than the aforementioned threshold 47.5 SBs, the number of tracks is increased. For example, when one track is added, the rest of the shortage becomes as follows:

100−(135−40)=5 SBs.

This is smaller than 47.5 SBs, so that no more track is added and the shortage, i.e., 5 SBs is compensated by reducing the search data of 40 SBs on the 121st track to 35 SBs.

In the above case, the GOP data, inclusive of the search data, could finally have been recorded onto an integer number of tracks, specifically, 121 tracks. If the increment is 142 SBs, the number of SBs for the search data to be adjusted is:

142−95=47 SBs.

In this case, one track is to be added.

Figure 25:
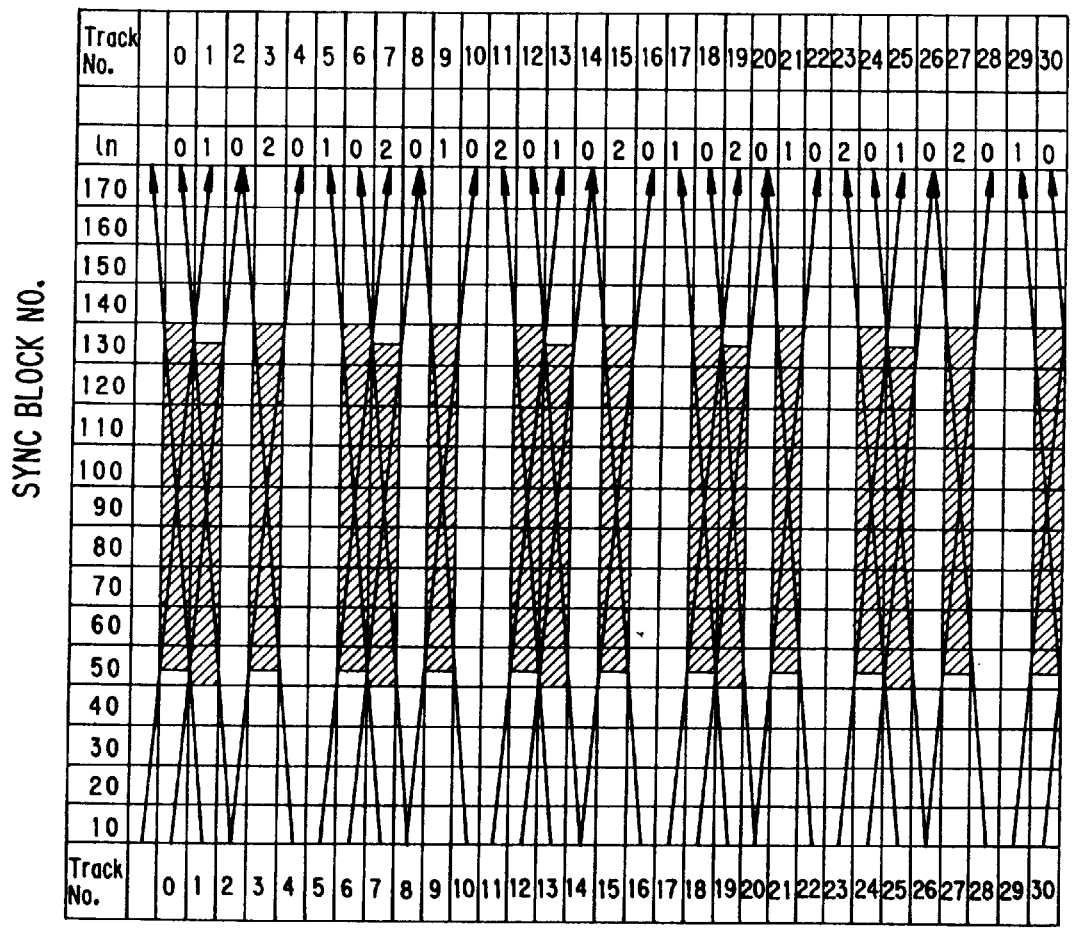
FIG. 25 is a diagram showing head traces for 3×-search-playback operation in the first embodiment of the present invention and a data-layout therefor.

Considering with reference to FIG. 25, the search data for 3x-speed mode exists on 109th (corresponding to No. 18 track), 110th (corresponding to No.19 track), 112th (corresponding to No.21 track), 115th (corresponding to No.24 track), 116th (corresponding to No. 25 track) and 118th (corresponding to No.27 track) tracks. Of these six tracks, 7 SBs of the search data are cut down from the 109th track, and 8 SBs are cut down from each of the remaining five tracks. In this case, only the search data for 3x-speed mode is adjusted to successfully reduce the data substantially evenly from both the data for the single-chip head arrangement and the data for the double-chip head arrangement. The adjustment of SBs to be reduced is not limited to the above allocation.

Next, description will be made on methods of protecting important portions such as packet headers. In order to protect important portions such as packet headers as well as to enable a high-speed search of the packet headers, some or several SBs should be secured. This can be done by adaptively reducing the amount of data to be used for search playback, by some SBs in the same manner as above or by utilizing spare SBs (for example, Video Aux. Area in SD-specifications). The thus obtained SBs are used to record the replica of the SBs containing the packet headers.

One of protecting methods includes the steps of picking up important portions such as packet headers from the bit stream, allocating the picked up data to some SBs and recording the SBs as a backup of the packet headers and other important portions.

Another protecting method includes the steps of: duplicating some SBs containing important portions such as ATV packet headers; allotting and recording the duplicated SBs as is to SBs secured for protecting, to produce a backup; and when an original SB containing an ATV packet header cannot be error-corrected, replacing the whole erroneous SB with a corresponding backup SB.

Specifically, when two ATV packets each composed of 188 bytes are allotted to five SBs; if, for example, two SBs of the five contain packet headers, the two SBs should and can be recorded as is to produce a backup. At reproducing, if the SB is erroneously detected and cannot be corrected, the SB may be substituted as a whole by the corresponding SB recorded for backup.

When a SB consisting of only image data has an insignificant error, naturally the image is slightly degraded. Nevertheless, even when the slightly erroneous data is recovered into ATV bit stream to be inputted to the ATV decoder; if the packet header is free from error, the apparatus will not cause an unusual situation in the operative system. In spite of that, since the image data itself contains abnormal information, it is necessary for the system to have a flag indicating abnormality of ATV headers and set the flag on to show 'occurrence of error' in the ATV header.

Examples of the packet headers to be protected include adaptation headers, PES headers and the like when the recorded signal is of the ATV. Examples of other important portions include program specific information and the like. When there are many SBs needing to be backed up, the amount of the search data to be recorded is set up to be small for the purpose of recording the backup data.

As to link headers, since each pack has a link header with it; when the entire SB is reserved for a backup, it is impossible to back up link headers because too many SBs are to be backed up. Accordingly, no backup is recorded for link headers when the whole SB should be backed up. Therefore, when a link header cannot be corrected as to its error, there are three kinds of possible measures to deal with the situation. That is, the ATV pack itself should be deserted; the error flag in the link header should be set on; or by guessing the PID, continuity flag and scramble control, based on the link header in the neighboring ATV pack, the thus predicted data is added with a sync of a fixed pattern and a flag which is unused in the ATV to be outputted. Of these, any method can be applied as long as it does not cause any malfunction in the system.

In order to carry out such substitution as above, it is possible to use the remaining four bytes in the aforementioned five SBs. At recording, these spare data areas (1 to 4 bytes) are allotted to the SBs containing ATV packet headers to be backed up and are used for numbering. This numbering is to be done so that the original SB has the same number as the backup SB has. Therefore, at the playback, if the SB cannot be corrected as to its error, the SB is replaced by the backup SB having the same number.

The latter method may back up image data together with the important data and is degraded in view of the efficiency of the tape usage, as compared to the method in which only the important portions are backed up. Nevertheless, since this method does effect neither byte-unit controls nor byte-unit processes, both of which would be required for handling short-length data such as packet headers and the like on the ATV bit stream, the controlling and processing circuit can be simplified.

The present invention can use other VCRs than that used in the above embodiment. The so-called simultaneous reproducible VCR is one of them. This VCR uses a double-chip head and is able to reproduce data immediately after the data is recorded. In the simultaneous reproducible VCR, one head disposed on the forward side (forward with respect to the rotating direction of the drum) of the double-chip head records a SB containing a packet header and right after the recording, the other head disposed in the rear side of the double-chip head reproduces the SB recorded immediately before for checking the recording condition. If the VCR detects a dropout of a SB, the device reproduces the correct data of the SB in question and reinserts the SB to record it again into a right place.

To achieve the above operation, the VCR need store each SB to be used as a backup until the simultaneous reproducing configuration judges if the dropout of the SB occurs. This method is effective to take measures against the dropout occurring at recording.

Next, description will be made on a configuration of the search data. Let us assume that the normal playback data increases by 100 SBs as in the above description and consider the way to lessen the amount of the search data to be recorded, by 100 SBs. At that time, the 3×-speed search data which is capable of being read out is limited within 333 SBs ((20) stated above) in this embodiment. In the first embodiment, when the 3×-speed search data was generated, 2.5 bytes were allotted to the five a.c. coefficients. If this allocation is reduced to 1.2 bytes, so that 2.1 bytes in total are allotted to the d.c. component of Y-signal and two chrominance signals and the a.c. components, the amount of the 3×-speed search data is lessened from 395 SBs (14) to approximately 332 SBs, whereby the data amount is made to fall within 333 SBs (20) designated above. At this time, the remainder 5 SBs (15) is reduced to 1 SB. This remaining SB can be used for backing up packet headers.

It is easily possible for any means other than the above-described search-data preparing means to vary the amount of the search data adaptively by changing the bit-allocation, selecting the amount of the coefficients appropriately and selecting a proper block.

Figure 26A:
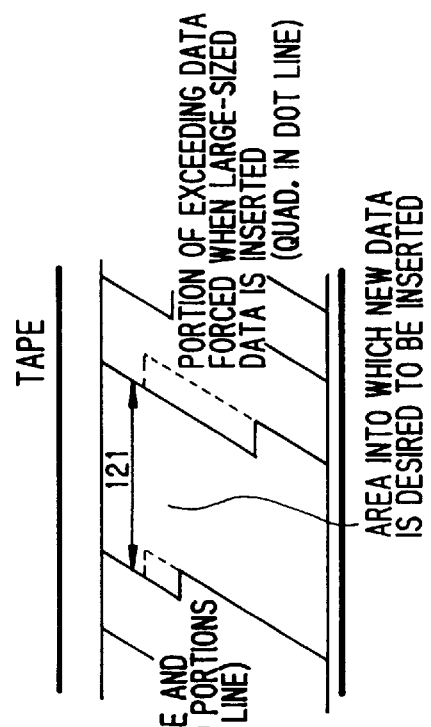
FIG. 26A is a diagram showing a condition of data recording areas on the tape when a video-program is inserted and recorded into the tape at the time of editing and the like in the second embodiment of the present invention.
Figure 26B:
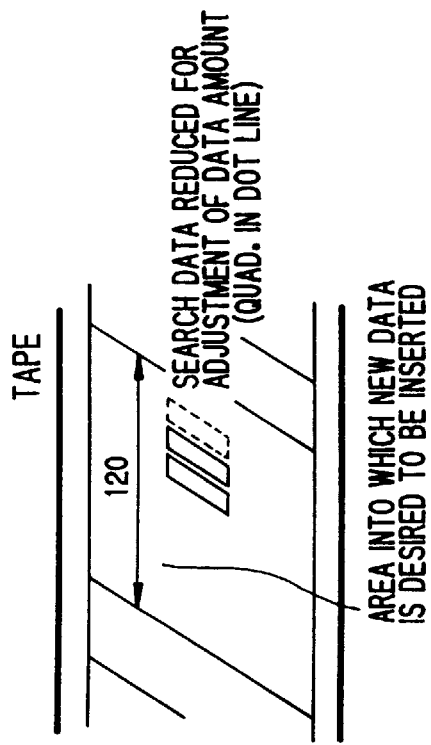
FIG. 26B is a diagram comparatively showing a condition of data recording areas on the tape when a video-program is inserted and recorded into the tape at the time of editing and the like, as compared to the embodiment shown in FIG. 26A.

Now, described will be a case where a video-program is inserted as edited data. In this case, if the displaying time of a video-program to be inserted is approximately equal to that of the data on the tape to be replaced by the video-program, the average amount of the video-program can be expected to be approximately equal to that of the data on the tape to be replaced. Therefore, it is possible to basically effect the aforementioned insert-recording which is favorable for editing work. Since the amount of the search data can be adjusted in the present invention; even if the amounts of the two data sets has a small difference therebetween, it is possible to exactly insert the program data into the data to be replaced by adjusting the search-data amount. FIGS. 26A and 26B show the situations of insert-recording. In FIGS. 26A and 26B, a bidirectional arrow designates a region of data on a GOP.

As has been explained in the description of the first embodiment, since the SD-VCR handles data having a data rate of 24.94 Mbps for recording while the data rate of the ATV bit stream is 19.30 Mbps, the SD-VCR is able to record about 1.3 times as much data as the ATV system. That is, if all the areas for the search data are used for recording a video-program to be inserted, it is possible to record on average about 1.3 times as much data as when the normal ATV bit stream is recorded. But, if the data is thus recorded, the search picture cannot be displayed. When the low-bit rate signal is recorded as shown in FIGS. 16 and 18, the output must be delivered as the low-bit rate signal. Therefore, the data areas cannot be completely eliminated, though it is possible to adjust the amount of data within a certain range.

Even if the amount of data to be inserted is less, it is possible up to a certain extent to realize the insertion of the short data and continuous playback of it by the combination of the buffer control and the fast-forward control. For example, when a video-program of 29 min. 59 sec. is inserted into an area of 30 min., a 1-sec. wasteful picture would be displayed in the normal playback operation. This operation, however, is controlled so that tracks corresponding to the one second are fast-forwarded while the display blanks in the times corresponding to the fast-forwarding are filled up with image data in the buffer. It is possible to increase the blank time by enlarging the capacity of the buffer, but the increment of the buffer capacity increases the cost. Specifically, if the apparatus will be allowed to deal with one-minute blank, the capacity of the buffer requires 1.2 Gbits when the data rate is 19.3 Mbps (60 times of 19.3 Mbits required for one second), resulting in increased cost. This scheme has such a limit, but if the amount of data does not greatly differ, it is possible for an observer to see the content continuously without having a feeling of discomfort before and after as well as during the interposed video-program.

In this case, it is necessary for a user to set up the procedure of the control in advance into the user area before inserting a video-program. The content to be set up includes, for example, how many tracks are fast-forward and after what seconds the data is started to reproduce and is delivered to the buffer and the other necessary information.

In the first embodiment, an already recorded video-program and a new video-program from the other source could not be recorded continuously by a single VCR set (needing two VCR sets), conventionally, but by utilizing the above scheme effectively, it becomes possible for a single VCR to effect the recording as if the two video-programs were continuously recorded, though within a certain limit.

Although the foregoing description of all the features was made on the case where the ATV bit stream is used to prepare data for the normal playback and for the special playback, the present invention will not be limited thereto. That is, it is possible to record and reproduce the hand-compressed image data encoded by MPEG 2 in the similar manner.

The present invention is to provide a recording apparatus for recording television signal having a wide band-range for the ATV, HDTV or the like which, in recent years, attracts a good deal of public attention as a near-future television apparatus of high quality of image with a wide display. That is, the present invention is to provide a digital VTR which is able to cope with the simultaneous broadcasting, or which, as recording a video-program of a band-compressed signal having a bit rate of 17 to 60 Mbps, creates a relatively low-bit-rate signal (1.5 to 5 Mbps with valid samples halved, valid lines halved) having the same program content and utilizes the relatively low-bit-rate signal as data for the special playback.

In accordance with the present invention, the means for adaptively varying the amount of the search data enables an integer number of tracks to be allotted to a GOP, to thereby ease editing work, although the allocation of an integer number of tracks was difficult in the digital VTR which adopts the high-efficiency coding scheme using variable-length coding. Accordingly, the apparatus of the present invention will never start recording from midway of a track and has enough margin for the accuracy of the device mechanism as well as for the accuracy in the control for maintaining the interchangeability to meet the tape pattern with the standard, therefore the apparatus is suitable for mass-production.

Since the means for adaptively varying the amount of the search data is able to create and secure recording areas, it is possible to record a backup of important portions such as packet headers ATV or MPEG 2 bitstream secured recording areas whereby, if an error arises in the original important data and still cannot be corrected, the erroneous data can be replaced by the backup data. Accordingly, the apparatus of the present invention hardly causes malfunctions at the level of the system.

What is claimed is:

1. A digital recording and reproducing apparatus for recording and reproducing both high-resolution data for normal playback and low-resolution data, having a small amount of information compared with the high-resolution data, for special playback on a recording medium, utilizing different recording areas of the recording medium, the low-resolution data having a same program content as the high-resolution data, the digital recording and reproducing apparatus completely recording a group of data consisting of a limited number of frames on an integer number of adjacent recording tracks, the group of data including the low-resolution data which are formed with respect to the group of data, the digital recording and reproducing apparatus comprising:

a controller for adaptively varying an amount of the low-resolution data, by enabling searching and editing with a group of mixed data as a unit so as to effectively record the high-resolution data and the low-resolution data on the integer number of adjacent recording tracks, by completely recording a mixed data group comprising the high-resolution data and the low-resolution data on the integer number of adjacent recording tracks, so that no unnecessary vacant position is formed on the integer number of adjacent recording tracks, wherein when an amount of the high-resolution data for normal playback is large, an amount of the low-resolution data for special playback is reduced by said controller in accordance with an increase in the high-resolution data, and when the amount of the high-resolution data is small, the amount of the low resolution data is increased by said controller in accordance with a decrease in the high-resolution data.

2. The digital recording and reproducing apparatus according to claim 1, wherein a group of the high-resolution data consisting of a limited number of frames and the low-resolution data with the same program content as the high-resolution data are mixed to enable reproduction of the low-resolution data as data completely without frame-skipping during reproduction for normal playback speed and low searching speed, in order to record both the high-resolution data and the low-resolution data in a recording area on the integer number of adjacent recording tracks, the digital recording and reproducing apparatus further comprising:

means for disposing the recording area on the integer number of adjacent recording tracks; and means for disposing the recording area for the low-resolution data which may be applied for special playback, as a normal playback is effected, the high-resolution data and also the low-resolution data having the same program content being completely reproduced simultaneously, individually and separately.

3. The digital recording and reproducing apparatus according to claim 1, wherein as a portion of a pre-recorded program content is rewritten in accordance with said controller for adaptively varying the amount of low-resolution data, if an amount of data of a program which is newly inserted for recording varies with respect to an amount of data of the pre-recorded program, the amount of the data of the program which is newly inserted is enabled to be adjusted to be the same as the amount of data of the pre-recorded program.

4. The digital recording and reproducing apparatus according to claim 1, wherein a packet-header or a sync block containing packet data are recorded overlapping in a special recording area wherein the packet-header or the packet data is either separated or newly formed from an input signal for data to be recorded, when correction of a coding error is impossible due to numerous generation of the coding error during reproduction, substitution is made by the packet-header or the sync block containing the packet data which are recorded overlapping, thus enabling elimination of erroneous detection due to the coding error.

5. The digital recording and reproducing apparatus according to claim 4, further comprising:

a simultaneously reproducing head; and a code-error detecting circuit for a packet-header reproduced by said simultaneously reproducing head or a sync block containing packet data, wherein when a coding-error is detected, data of the packet-header or the sync block containing the packet data is inserted into data to be recorded, and subsequently recorded again, thus eliminating erroneous operation during recording.

6. A digital recording and reproducing method for recording and reproducing both high-resolution data with a large amount of information for normal playback and low-resolution data with a small amount of information for special playback on a recording medium, utilizing different recording areas of the recording medium, the low-resolution data having a same program content as the high-resolution data, the digital recording and reproducing method completely recording a group of data consisting of a limited number of frames on an integer number of adjacent recording tracks, the group of data including the low-resolution data which are formed with respect to the group of data, the digital recording and reproducing method comprising the steps of:

adaptively varying an amount of the low-resolution data, which has a same program content as the high-resolution data, in accordance with an amount of high-resolution data to be recorded; and completely recording a group of mixed data consisting of the high-resolution data and the low-resolution data on the integer number of adjacent recording tracks, to enable searching and editing with the group of mixed data as a unit.

7. The digital recording and reproducing method according to claim 6, wherein a group of the high-resolution data consisting of a limited number of frames and the low-resolution data with the same program content are mixed to enable reproduction of the low-resolution data as data completely without frame-skipping during reproduction for normal playback speed and low searching speed, in order to record both the high-resolution data and the low-resolution data in a recording area on the integer number of tracks, the digital recording and reproducing method further comprising the steps of:

disposing the recording area on the integer number of adjacent tracks; and disposing the recording area for the low-resolution data which may be applied for special playback, as a normal playback is effected, the high-resolution data and also the low-resolution data having the same program content being completely reproduced simultaneously, individually and separately.

8. The digital recording and reproducing method according to claim 6, wherein as a portion of a pre-recorded program content is rewritten in accordance with the adaptively varied amount of the low-resolution data, if an amount of data of a program which is newly inserted for recording varies with respect to an amount of data of the pre-recorded program, the amount of the data of the program which is newly inserted is enabled to be adjusted to be the same as the amount of data of the pre-recorded program.

9. The digital recording and reproducing method according to claim 6, wherein a packet-header or a sync block containing packet data are recorded overlapping in a special recording area wherein the packet-header or the packet data is either separated or newly formed from an input signal for data to be recorded, when correction of a coding error is impossible due to numerous generation of the coding error during reproduction, substitution is made by the packet-header or the sync block containing the packet data which are recorded overlapping, thus enabling elimination of erroneous detection due to the coding error.

10. The digital recording and reproducing method according to claim 9, further comprising:

simultaneously reproducing the data recorded on the recording medium; and detecting code errors in a simultaneously reproduced packet-header or sync block containing packet data, wherein when a code error is detected, data of the packet-header or the sync block containing the packet data is inserted into data to be recorded, and subsequently recorded again, thus eliminating erroneous operation during recording.

* * * * *